US009961190B2

(12) United States Patent
He et al.

(10) Patent No.: US 9,961,190 B2
(45) Date of Patent: *May 1, 2018

(54) SYSTEM AND METHOD FOR PERFORMING MOBILE TELEPHONE CALLING AND/OR MESSAGING OPERATIONS IN-GAME DURING COMPUTER GAME APPLICATION EXECUTION

(71) Applicant: RAZER (ASIA-PACIFIC) PTE LTD., Singapore (SG)

(72) Inventors: Ping He, San Francisco, CA (US); Joseph Gerard Kuzma, Carlsbad, CA (US); Hai Phan, San Diego, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/211,291

(22) Filed: Jul. 15, 2016

(65) Prior Publication Data

US 2016/0330314 A1    Nov. 10, 2016

Related U.S. Application Data

(63) Continuation of application No. 14/769,748, filed as application No. PCT/SG2013/000068 on Feb. 21, 2013, now Pat. No. 9,426,276.

(51) Int. Cl.
*H04W 4/14* (2009.01)
*H04M 1/725* (2006.01)
(Continued)

(52) U.S. Cl.
CPC ........ *H04M 1/72597* (2013.01); *G06Q 10/10* (2013.01); *G06Q 50/32* (2013.01);
(Continued)

(58) Field of Classification Search
CPC ......... H04M 1/72544; H04M 1/72597; H04M 1/72519; H04M 3/02; H04W 4/14; H04W 68/005; G06Q 10/10; G06Q 50/32
(Continued)

(56) References Cited

U.S. PATENT DOCUMENTS 6,618,470 B2 *  9/2003  Shibuya ............ H04M 1/72522
                                                         379/93.17
7,069,044 B2 *  6/2006  Okada ..................... A63F 13/10
                                                         455/556.1
(Continued)

FOREIGN PATENT DOCUMENTS

CN    1550983 A    12/2004
CN    1906568 A     1/2007
(Continued)

OTHER PUBLICATIONS

First Office Action dated Jan. 26, 2016, for Taiwanese Patent Application No. 103105834.
(Continued)

*Primary Examiner* — Siu Lee
(74) *Attorney, Agent, or Firm* — Polsinelli PC

(57) ABSTRACT

The present application provides a system and method for providing telephony functions for operation during a computer game application execution. In particular, a system and method for performing mobile telephony calling and/or messaging operations in-game during computer game application execution is provided. In the disclosure, a mobile telephony user interface is provided and operated in conjunction with a computer game user interface presenting a game environment to a gamer. Mobile telephony operations are provided by way of the mobile telephony user interface in a manner that at least substantially avoids interrupting (Continued)

gamer perception of ongoing game play and gamer interaction with the game environment.

18 Claims, 16 Drawing Sheets

(51) Int. Cl.
  *G06Q 10/10* (2012.01)
  *G06Q 50/32* (2012.01)
  *H04M 3/02* (2006.01)
  *H04W 68/00* (2009.01)
(52) U.S. Cl.
  CPC ... *H04M 1/72544* (2013.01); *H04M 1/72583* (2013.01); *H04M 3/02* (2013.01); *H04W 4/14* (2013.01); *H04W 68/005* (2013.01)
(58) Field of Classification Search
  USPC .............. 455/414.1; 465/41; 463/41
  See application file for complete search history.

(56) References Cited

U.S. PATENT DOCUMENTS

| | | | |
|---|---|---|---|
| 7,812,814 B2 | 10/2010 | Foxenland | |
| 8,588,758 B2* | 11/2013 | Ullrich | G06F 3/017 455/414.1 |
| 9,392,043 B2 | 7/2016 | Cadiz et al. | |
| 2002/0094069 A1* | 7/2002 | Takahashi | H04M 1/72 379/93.17 |
| 2008/0268911 A1 | 10/2008 | Eronen et al. | |
| 2009/0210483 A1* | 8/2009 | Pierce | A63F 13/12 709/203 |
| 2009/0276529 A1 | 11/2009 | Ivory et al. | |
| 2011/0086711 A1 | 4/2011 | Dunko et al. | |
| 2014/0045463 A1* | 2/2014 | Hsieh | G06F 1/1643 455/411 |

FOREIGN PATENT DOCUMENTS

| | | |
|---|---|---|
| KR | 10-2006-0115304 A | 11/2006 |
| TW | 200724208 | 7/2007 |
| WO | 2011035442 A1 | 3/2011 |

OTHER PUBLICATIONS

First Office Action dated Jan. 4, 2017 in corresponding Chinese Patent Application No. 201380075783.3, 17 pages.

* cited by examiner

FIG. 6B

Configure In-Game Calling / Messaging

Number of Players:

Select Player: ▼ Player 1 / Player 2 / Player 3

Player 1 Mobile Number:

☐ Enable In-Game Calling
Hotkey Sequences
Make Call:
Answer Call:

☐ Enable In-Game Messaging
Hotkey Sequences
Write Msg:
View Msg:

☐ Enable Audio Ringing
Max. Rings:

☐ Enable Speech Processing

[ Save ]    [ Restore Defaults ]

600

US 9,961,190 B2

SYSTEM AND METHOD FOR PERFORMING MOBILE TELEPHONE CALLING AND/OR MESSAGING OPERATIONS IN-GAME DURING COMPUTER GAME APPLICATION EXECUTION

CROSS REFERENCE TO RELATED APPLICATIONS

This application is a continuation of and claims the benefit of U.S. application Ser. No. 14/769,748, filed on Aug. 21, 2015, and which is a national stage entry of PCT/SG2013/000068 having a filing date of Feb. 21, 2013; both of which are expressly incorporated by reference herein in their entireties.

TECHNICAL FIELD

Particular aspects of the present disclosure relate generally to systems and methods for interfacing separate or distinct electronic devices, such as a first and a second electronic device; and (a) controlling functionality corresponding to the first electronic device, as well as (b) performing network communication operations directly available to the first electronic device, but typically unavailable to the second electronic device, from within the execution context of an application program executing on the second electronic device. An aspect of the present disclosure relates to a system and method for controlling and performing mobile telephone operations, including mobile telephone calling and/or messaging operations, in-game during the execution of a computer game application on a computer system that is distinct or separate from the mobile telephone.

BACKGROUND

During the execution of various types of computer or electronic games, and in particular highly immersive or full screen computer games, the game player or gamer typically directs a substantial percentage of their mental focus, and possibly nearly their entire mental focus, to game play. Furthermore, the gamer's hands and possibly other body parts (e.g., arms and legs) can frequently be occupied with manipulation of input devices by which gamer input corresponding to game play occurs (e.g., rapid/high intensity gamer interaction with a mouse, keyboard, game console, and/or other type of gaming user input device or interface).

As a result, a gamer's desire and/or capacity to focus on interruptions outside of the context of game play is, at best, often limited. Moreover, gamers commonly view such game interruptions as undesirable or annoying because addressing the source or cause of a game interruption at least results in gamer distraction, and usually requires that the gamer stop playing the game for a period of time. With respect to various types of multi-player games, such as Massively parallel Multiplayer Online (MMO) games involving very large numbers of gamers, even though a specific game player has temporarily stopped playing, game events and corresponding game evolution continue to occur, which can adversely affect this particular gamer's situation within a game environment (e.g., during a multi-player battle scenario).

One source of game interruption is mobile telephone calls. For instance, when a gamer's mobile telephone receives an incoming call, in order to take the call, the gamer's attention and at least one of the gamer's hands must be directed to interaction with the mobile telephone for a period of time, which interrupts and/or can adversely affect the gamer's interaction with the computer game.

A need exists for a system and method for significantly reducing or minimizing the extent to which gamer handling of potential game interruptions results in gamer distraction or game play interruption.

SUMMARY

When a gamer is playing a computer or electronic game, the underlying or corresponding computer game application commonly provides a visual game environment that occupies the entire, or essentially the entire, display area of a display device by which the visual game environment is presented to the gamer. During a gamer's interaction with the computer game application, that is, while the computer game application is executing and processing game events corresponding to gamer input, which can be defined as an "in-game" situation or scenario, no other application program can run on top of the game session, especially if the game is running in full-screen mode.

Several embodiments in accordance with the present disclosure are directed to systems and processes by which a gaming device and at least one mobile device such as a mobile telephone are configured for communicating with each other and performing particular mobile device operations involving signal or data transfer over a network with which the mobile device can communicate (e.g., a mobile telephone network) during game play, where such mobile device operations are selectable by way of gamer input directed to visual or graphical objects presented within a visual game environment. For instance, in an embodiment, a gaming device (e.g., a computer system or game console) and a mobile telephone are configured for communicating with each other such that during the gaming device's execution of a computer game application that generates a visual game environment, mobile telephony/messaging operations can be selectively performed in-game by way of gamer interaction with visual mobile telephony/messaging objects (e.g., mobile telephony/messaging icons or buttons) that are presented directly within the visual game environment itself, such as by way of a mobile telephony visual interface that is presented to the gamer during game play, in conjunction with presentation of the visual game environment to the gamer (e.g., such that portions of the mobile telephony visual interface are presented within or overlay portions of the visual game environment). For instance, gamer interaction with the visual mobile telephony/messaging objects can occur in response to gamer interaction with one or more handheld input devices (e.g., a gaming device keyboard, keypad, mouse, joystick, controller, or control pad). In some embodiments, at least some mobile device operations are additionally or alternatively selectable or performable by way of gamer voice signals directed to a microphone corresponding to the gaming device.

In-game communication between an executing computer game application and one or more mobile devices in accordance with embodiments of the present disclosure integrates a game play environment and a personal communication environment, in a manner that greatly reduces or minimizes gamer distraction and game play interruption. Thus, systems and processes in accordance with embodiments of the present disclosure integrate one or more portions of a mobile device user interface with a game play environment, such that game play and particular mobile device operations can occur in an essentially seamless or perceptually simultaneous manner with respect to the progressive or dynamic processing of game events and the corresponding evolution of game play.

In accordance to a first aspect of the disclosure, there is provided a process for providing mobile telephony operations supported by a mobile telephone to a computer gamer while the gamer plays a computer game by way of execution of a computer game application on a computer system, the mobile telephony operations including at least one of mobile telephone calling operations and mobile telephone messaging operations, the process including providing a computer game user interface responsive to input received from the gamer during execution of the computer game application, the computer game user interface presenting a game environment including a visual game environment to the gamer; providing a mobile telephony user interface responsive to input received from the gamer during execution of the computer game application, the mobile telephony user interface for selectively controlling the mobile telephony operations; and performing mobile telephony operations by way of mobile telephony user interface in a manner that at least substantially avoids interrupting (a) gamer perception of ongoing game play, and (b) gamer interaction with the visual game environment.

According to an embodiment of the present disclosure, the mobile telephony user interface provides at least one of a visual mobile telephony interface and an audio mobile telephony interface to the gamer during execution of the computer game application.

According to an embodiment, the visual mobile telephony user interface includes a set of visual objects presented within a portion of the visual game environment.

In accordance to an embodiment, the mobile telephone calling operations include some or each of providing a notification of an incoming mobile telephone call to the gamer by way of the mobile telephony interface; answering an incoming mobile telephone call in response to gamer input directed to the mobile telephony interface; making an outgoing mobile telephone call in response to gamer input directed to the mobile telephony interface; and communicating mobile telephone call voice signals between the mobile telephone and a mobile telephony module corresponding to the computer game application, the mobile telephony module comprising program instructions loaded for execution in association with loading the computer game application for execution by the computer system.

In an embodiment, providing a notification of an incoming mobile telephone call includes at least one of presenting a visual notification to the gamer by way of a visual object within a portion of the visual game environment and presenting an audio notification to the gamer by way of a speaker during computer game application execution.

In another embodiment, at least one of answering an incoming mobile telephone call and making an outgoing mobile telephone occurs in response to one of gamer selection of a visual object within a portion of the visual game environment and receipt of gamer speech directed to a microphone during computer game application execution.

In an embodiment of the present disclosure, the mobile telephone messaging operations include providing a notification of a newly received unread message to the gamer by way of the mobile telephony interface; composing a message in response to gamer input directed to the mobile telephony interface; communicating message content between the mobile telephone and a mobile telephony module corresponding to the computer game application, the mobile telephony module comprising program instructions loaded for execution in association with loading the computer game application for execution by the computer system; presenting message content to the gamer by way of the mobile telephony interface; and sending a message to at least one destination mobile telephone number in response to gamer input directed to the mobile telephony interface.

In a next embodiment, providing a notification of a newly received unread message includes at least one of presenting a visual notification to the gamer by way of a visual object within a portion of the visual game environment and presenting an audio notification to the gamer by way of a speaker during computer game application execution.

In an embodiment, at least one of composing a message, presenting a message, and sending a message occurs in response to one of gamer selection of a visual object within a portion of the visual game environment and receipt of gamer speech directed to a microphone during computer game application execution.

According to another embodiment, the computer system is distinct, separate, or separable from the mobile telephone.

According to an embodiment of the disclosure, the process further includes initiating execution of a remote calling/messaging application on the mobile telephone; initiating execution of the computer game application and a corresponding mobile telephony module on the computer system, wherein the mobile telephony module is loaded for execution during loading of the computer game application for execution; and establishing communication between the remote calling/messaging application and the mobile telephony module.

According to an embodiment, the process includes communicating at least one of mobile telephone call information and mobile telephone message information between the remote calling/messaging application and the mobile telephony module during computer game execution; and presenting mobile telephone call information to the gamer in a manner that avoids substantially affecting a frame update rate at which visual game environment updates occur.

According to a next aspect of the present disclosure, there is provided a system for providing mobile telephony operations to a computer gamer while the gamer plays a computer game, the system including a mobile telephone configured for communication with a mobile telephone network; a computer system having: a processing unit; and a memory, the memory including: a computer game application executable by the processing unit, the computer game application when executed providing a computer game user interface presenting a game environment including a visual game environment to the gamer during game play; and a mobile telephony module corresponding to the computer game application, the mobile telephony module comprising program instructions loaded for execution in association with loading the computer game application for execution, the mobile telephony module providing a mobile telephony user interface responsive to input received from the gamer during execution of the computer game application for selectively controlling at least one of mobile telephone calling operations and mobile telephone messaging operations provided by the mobile telephone in a manner that at least substantially avoids interrupting (a) gamer perception of ongoing game play, and (b) gamer interaction with the visual game environment.

In accordance to an embodiment, the computer system is distinct, separate, or separable from the mobile telephone.

In an embodiment, the mobile telephone includes: a mobile telephone processing unit; and a memory including a mobile operating system and a remote mobile telephone control application executable by the mobile telephone processing unit, the remote mobile telephone control application configured for communication with each of the mobile operating system and the computer system's mobile telephony module.

In another embodiment, the mobile telephone includes a first communication interface and the computer system includes a second communication interface, and wherein at least one of mobile telephone call voice signals and mobile telephone message contents are exchanged between the remote mobile telephone control application and the mobile telephony module during computer game application execution by way of the first communication interface and the second communication interface.

According to an embodiment, the mobile telephony module is responsive to at least one of visual gamer input and audio gamer input directed to performing a mobile telephone calling operation or a mobile telephone messaging operation during game play.

According to an embodiment, the computer system further includes at least one of a keyboard, a mouse, a joystick, and a game controller configured for receiving gamer input corresponding to each of game play and mobile telephony operations.

In an embodiment, the computer system further includes a microphone configured for receiving gamer input corresponding to at least one of mobile telephone calling operations and mobile telephone messaging operations.

According to an embodiment of the present disclosure, the computer system further includes a display device configured for presenting the visual game environment to the gamer, and the mobile telephony interface selectively presents a set of visual mobile telephony control objects to the gamer within a portion of the visual game environment during game play.

According to an embodiment, the set of visual mobile telephony control objects includes: a first visual object corresponding to a notification of an incoming mobile telephone call; a second visual object corresponding to a gamer instruction to establish an outgoing mobile telephone call; and a third visual object corresponding to a gamer instruction to terminate an ongoing mobile telephone call.

In an embodiment, the set of visual mobile telephony control objects includes: a first visual object corresponding to a notification of a new unread message; a second visual object corresponding to a gamer instruction to compose a message; and a third visual object corresponding to a gamer instruction to send a message to at least one destination mobile telephone number.

BRIEF DESCRIPTION OF THE DRAWINGS

FIGS. 6A and 6B are schematic illustrations of representative mobile telephony/messaging configuration interfaces in accordance with particular embodiments of the present disclosure.

DETAILED DESCRIPTION

Figure 1A:
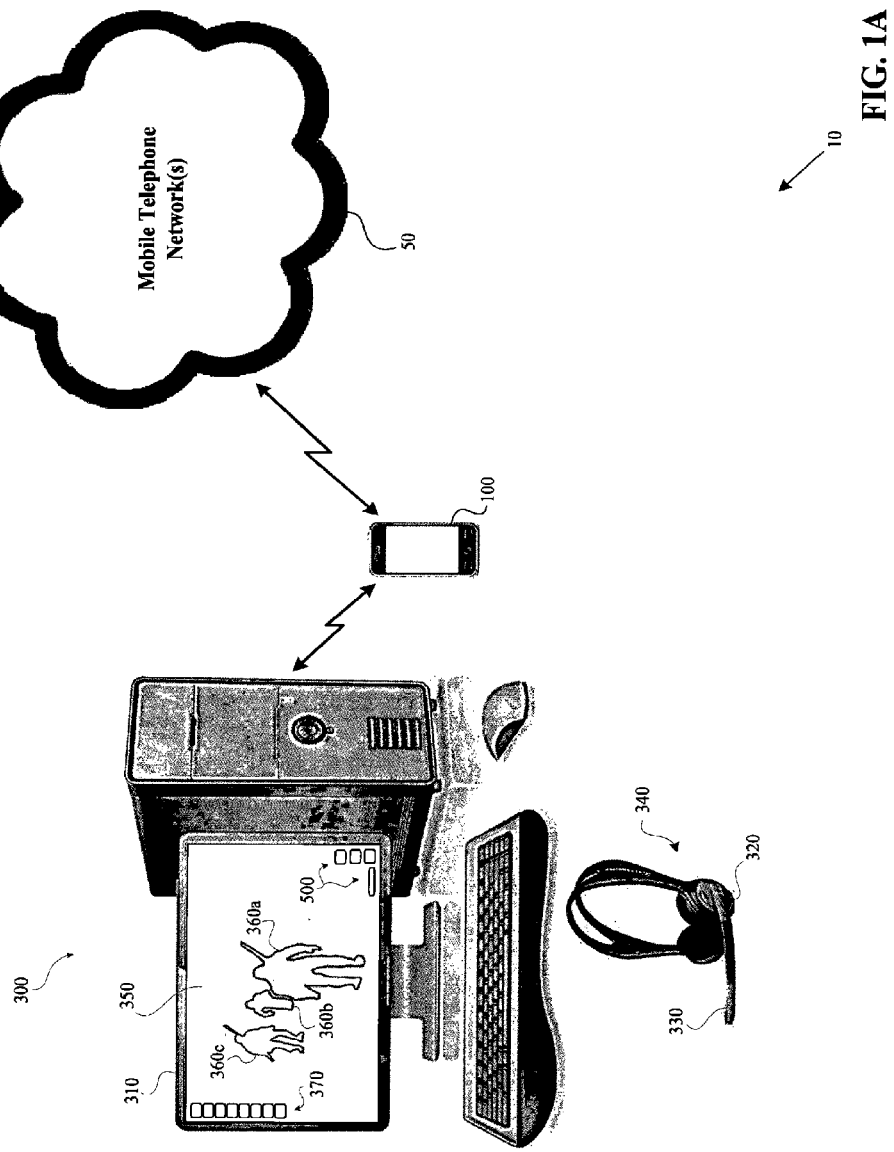
FIGS. 1A and 1B are a schematic illustration of a system for interfacing at least one mobile device such as a mobile telephone with a computer system, and performing mobile telephone calling and/or mobile telephone messaging operations in-game, that is, from within the execution context of a computer game application executing on the computer system in accordance with an embodiment of the present disclosure.

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in *An Introduction to Mathematical Reasoning: fxNumbers, Sets, and Functions*, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration.

Embodiments in accordance with the present disclosure are directed to systems and processes for (a) interfacing a set of mobile devices with a computer system or computing device, which in multiple embodiments is distinct or separate from (e.g., external to) the set of mobile devices; (b) communicating with the mobile device(s) and controlling particular functions intrinsically or inherently provided by the mobile device(s) from within an execution context of an application program that is executing on the computer system or computing device; and (c) facilitating or effectuating information transfer (e.g., voice signal transfer, text message transfer, and/or multimedia message transfer) between the application program and at least one mobile communication network with which the mobile device(s) can communicate. For purpose of brevity and clarity, in various embodiments described herein, the set of mobile devices includes or is a mobile telephone, for instance, a commercially available smartphone such as an Apple iPhone (Apple Inc., Cupertino, Calif. USA), a Samsung Galaxy (Samsung Electronics, Suwong, South Korea), or similar type of mobile telephony device; and the application program corresponds to or implements portions of a computer or electronic game that includes program instructions executing on a computer system or computing device such as a desktop computer, a laptop or notebook computer, a tablet computer, or an electronic gaming device or system (e.g., a Nintendo Wii, a Microsoft Xbox, a Sony PlayStation, or another type of video/visual gaming console). In the description hereafter, a computing device is referred to as a computer system for purpose of brevity.

In view of the foregoing, in several embodiments the present disclosure is directed to a system and process for (a) interfacing a mobile telephone with a computer system that is distinct or separate from the mobile telephone; and (b) controlling and performing mobile telephone operations or functions associated with mobile or cellular telephone network communication, including one or more of making outgoing telephone calls, receiving incoming telephone calls, creating and sending messages (e.g., short messaging service (sms) and/or multimedia messaging service (mms) messages), and receiving messages, from within an execution context of the computer game application. Thus, controlling and performing mobile telephone operations or functions occurs in response to gamer input generated while in-game, where such gamer input is processed by program instructions corresponding to the computer game application while the computer user or gamer interacts with a game play environment as part of their in-game experience. Controlling and performing mobile telephone operations therefore occurs in a seamless manner with respect to the progressive or dynamic evolution of the game play environment presented to the gamer during computer game application execution, and in a manner that at least substantially avoids, or essentially avoids, interrupting gamer perception of ongoing game play and gamer interaction with a computer game user interface.

Notwithstanding the foregoing, in some embodiments, the set of mobile devices can include additional or other types of devices; and/or the application program executing on the computer system/computing device can be other than a computer game application, for instance, a word processing, accounting/spreadsheet, educational (e.g., language instruction), web browser, social media, or other application program.

Figure 1B:
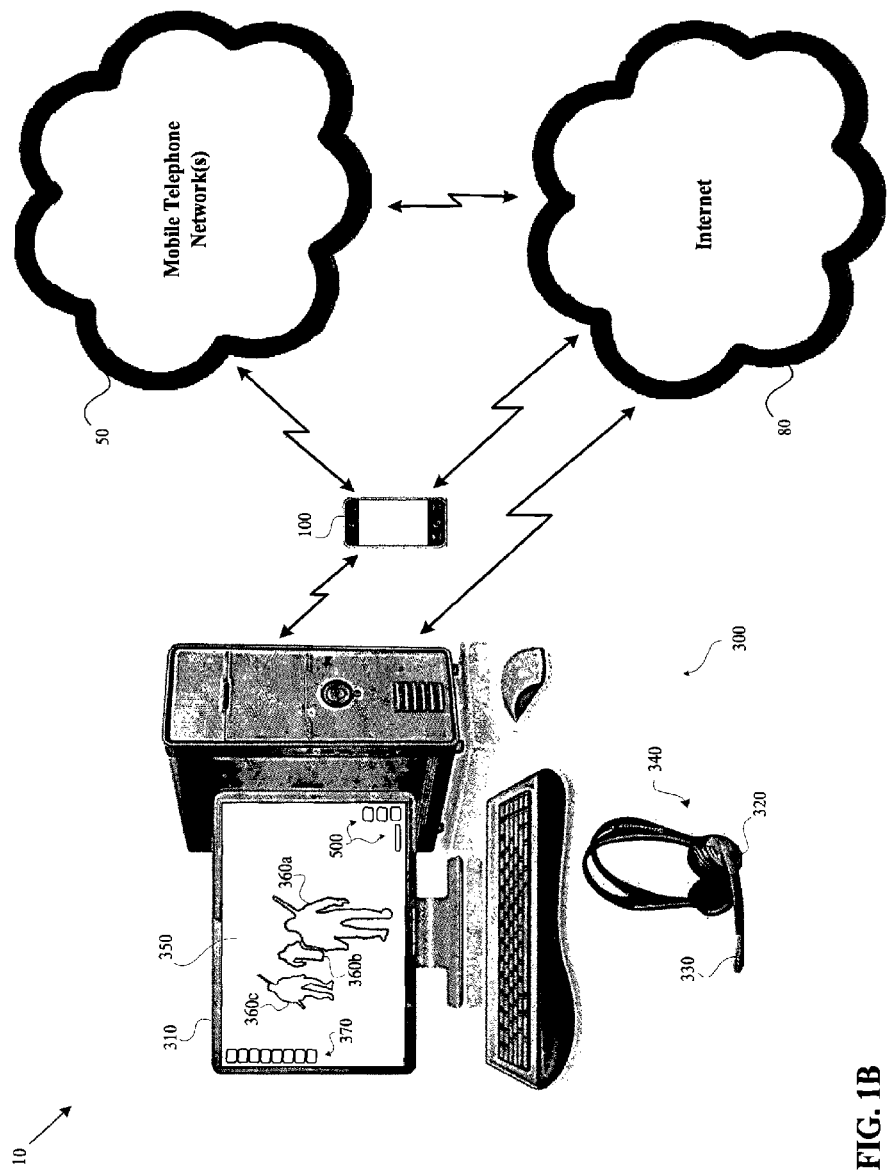

FIGS. 1A and 1B are schematic illustrations of a system 10 for interfacing at least one mobile telephone 100 with a distinct or separate computer system 300, and performing mobile telephone calling and/or mobile telephone messaging operations from within the execution context of a computer game application executing on the computer system 300 in accordance with an embodiment of the present disclosure. The mobile telephone 100 includes a portable or handheld telephone having a processing unit configured for executing program instructions; a memory (e.g., Random Access Memory (RAM) and Read-only Memory (ROM)) in which program instructions can reside; possibly one or more types of interfaces configured for receiving computer/electronically readable media (e.g., a memory card interface for receiving a Secure Digital (SD) or other type of data storage card); a mobile telephone display; dialing and messaging interfaces, which can be implemented by way of the mobile telephone display; mobile/cellular network communication resources configured for wireless communication (e.g., voice communication, and in various embodiments also data communication) with a mobile/cellular telephone network 50; and additional, secondary, or local communication resources configured for wireless and/or wire-based communication (e.g., by way of WiFi, BlueTooth, Universal Serial Bus (USB), WiMax, 3G, Long Term Evolution (LTE), and/or one or more other communication technologies) with other devices, which are typically located near, generally near, or somewhat near the mobile telephone 100, including the computer system 300.

The computer system 300 includes at least one processing unit configured for executing program instructions; a memory (e.g., RAM and ROM) in which program instructions can reside; a data storage unit (e.g., a hard disk drive); a display device 310 (e.g., a computer monitor); one or more types of interfaces (e.g., a USB interface) for coupling to other devices/systems and/or receiving computer/electronically readable media; computer networking resources (e.g., a network interface unit configured for information transfer involving a Local Area Network (LAN), a Wide Area Network (WAN), the Internet, and/or another computer network); additional, secondary, or local communication resources configured for wireless and/or wire-based communication (e.g., by way of WiFi, BlueTooth, USB, WiMax, Long Term Evolution (LTE), and/or one or more other communication technologies) with other devices, which are commonly near, generally near, or somewhat near the computer system 300, including the mobile telephone 100; and typically a set of speakers 320 and a microphone 330, which can form portions of a headset 340 (e.g., a computer gaming headset) that is wearable by a user or gamer, or which can be provided in another form (e.g., as stand-alone devices). In a number of embodiments, the computer system 300 includes visual or multimedia information processing resources that are separate or distinct from a main processing unit (e.g., a video card having a visual/graphics processing unit and corresponding local memory), which can perform particular types of visual or multimedia processing operations in a manner that is at least substantially independent of the main processing unit.

As indicated in FIG. 1B, systems 10 in accordance with embodiments of the present disclosure can exhibit different network communication configurations depending upon the capabilities of a mobile telephone 100 and/or computer system 300 under consideration. For instance, in addition to being configured for voice signal communication over a mobile/cellular network 50, a mobile telephone 100 can be configured for communication with the Internet 80 by way of the mobile/cellular network 50 and/or by way of another wireless network. Depending upon embodiment details, a computer system 300 can be configured for communication with the Internet 80 independent of a mobile/cellular network 50, or the computer system 300 can be configured for communication with the Internet 80 in a manner that depends upon a mobile/cellular network 50, such as by way of built-in/plug-in LTE communication resources, or tethering involving the mobile telephone 100.

The computer system 300 is configured for executing at least one computer game application, which can include program instructions that implement essentially type of single-player or multi-player computer or electronic game, on a single/stand-alone computer system 300 or across one or more computer systems 300 coupled to a set of computer networks (e.g., the computer game application can be a massively multiplayer online (MMO) game in which game play involves program instruction execution by many computer systems coupled to the Internet). A computer game in accordance with an embodiment of the present disclosure can be, for instance, a game corresponding to or categorized as one or more of a strategy game, a tactical game, an adventure game, a visual novel, an interactive movie, an action-adventure game, a role playing game, a navigation game, a combat game, a first person (e.g., first person shooter) game, a third person (e.g., third person shooter) game, a vehicular (e.g., racing) game, an educational game, a training game, a simulation (e.g., a life scenario, construction, business, aircraft, spacecraft, or other type of simulation) game, a maze game, a puzzle game, a trivia game, a board game (e.g., checkers, chess, or mahjong), a card game, a gambling game, a music game, a dance game, a sports game, an exercise game, a party game, and/or another type of game.

The computer game application provides a computer game user interface, which includes a visual interface (e.g., by way of an operating system corresponding to the computer system 300, a set of visual/graphical user interface (GUI) functions, and a multimedia application program interface (API), for instance, a DirectX API) that presents a visual game environment 350 upon the computer system's display device 310 to a computer user or gamer. The visual game environment 350 provides the main viewable interface by which game play occurs, that is, by which real time, near-real time, synchronous, essentially or approximately synchronous, or progressive user interaction with the game and user responsive advancement of game play occurs. That is, the visual game environment 350 provides a main or primary source of visual information or visual content by which the effects of local and/or remote game player input upon computer game application execution are conveyed to the gamer (e.g., on a progressive or dynamic basis during game play). Such visual game content can include game characters 360*a-c* (e.g., avatars), game objects or elements, game constructs (e.g., scenery), and possibly other information (e.g., game character status information). The visual game environment 350 also provides one or more sets of user selectable game control elements 370, such as icons and/or buttons corresponding to game function hotkeys or keystroke sequences, in a manner understood by one of ordinary skill in the relevant art.

As part of the computer game user interface, the computer game application additionally provides an audio/auditory interface (e.g., by way of the computer system's operating system and a set of audio interface functions), which presents an audio/auditory game environment to the gamer by way of the computer system's speakers 320. In several embodiments, the audio/auditory interface includes the microphone 330.

Embodiments in accordance with the present disclosure further provide an in-game mobile telephony/messaging interface responsive to gamer input received during game play, which in various embodiments includes a visual mobile telephony/messaging interface 500. A visual mobile telephony/messaging interface 500 can include one or more sets of visual or graphical objects or elements selectively presented within or overlaid upon portions of the visual game environment 350. In an embodiment, the visual mobile telephony/messaging interface 500 includes mobile telephone command/control/operation icons and/or buttons and one or more associated mobile telephony/messaging windows that facilitate the selective performance of particular mobile telephone operations such as making or receiving telephone calls and/or sending or receiving/reading messages in response to gamer input.

Taken together, the visual game environment 350 and the audio game environment provide an overall or immersive game play environment to the gamer. In some embodiments, a mobile telephony/messaging interface additionally or alternatively includes an in-game audio mobile telephony/messaging interface that is responsive to gamer speech signals received during game play, as further detailed below.

Figure 2A:
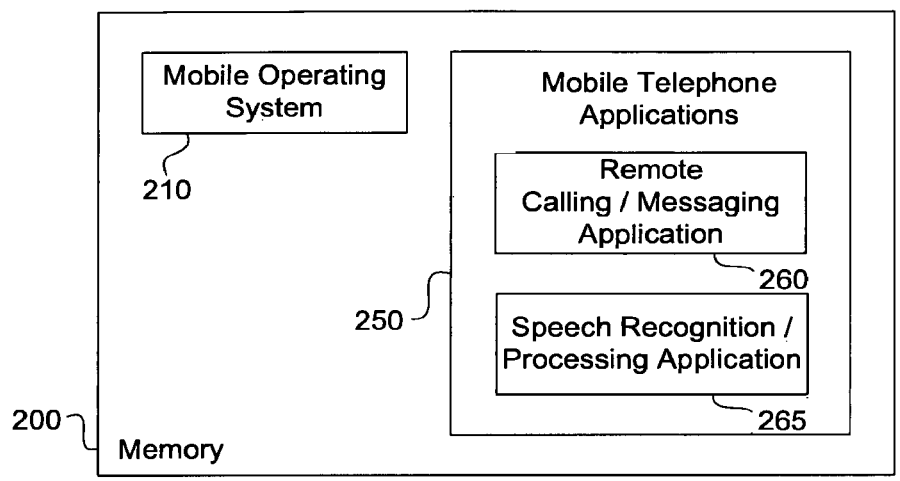
FIGS. 2A and 2B are schematic illustrations showing aspects of particular representative program instruction sets corresponding to a mobile telephone and a computer system, respectively, in accordance with an embodiment of the present disclosure.
Figure 2B:
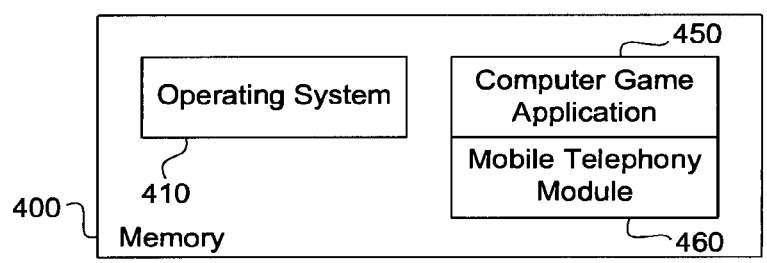

FIGS. 2A and 2B are schematic illustrations showing aspects of particular representative program instruction sets corresponding to the mobile telephone 100 and the computer system 300, respectively, in accordance with an embodiment of the present disclosure. Such program instruction sets facilitate mobile telephone—computer system communication, and in-game control and performance of mobile telephone functions or operations from within a visual game environment provided by a computer game application executing on the computer system 300.

As indicated in FIG. 2A, within the mobile telephone 100 a mobile telephone memory 200 includes a mobile operating system 210, and a set of mobile telephone applications 250 corresponding to program instruction sets that are executable by the mobile telephone's processing unit. The set of mobile telephone applications 250 includes a secondary, external, or remote calling/messaging control application 260 that (a) facilitates or establishes bidirectional communication with the computer system 300 (e.g., by way of a standard wireless or wire-based communication interface); (b) receives mobile telephony commands and associated data (e.g., accept call, dial call, read message, or send message commands) from the computer system 300; (c) passes or transfers received mobile telephony commands and associated data to the mobile operating system 210 for execution by the mobile telephone 100; and (d) communicates telephone call notifications, telephone call content (e.g., voice signals or data), message notifications, and message content to the computer system 300. In some embodiments, the remote calling/messaging control application 260 can also selectively communicate one or more types of data stored within or accessible to the mobile telephone 100 to the computer system 300, such as names and telephone numbers identified in a contacts list corresponding to the mobile telephone 100. In a number of embodiments, the set of mobile telephone applications 250 also includes a voice or speech processing/recognition application 265, such as a mobile telephone resident application corresponding to or associated with Apple Computer's Siri, Samsung Electronics' S-Voice, or other voice/speech processing/recognition service or environment.

As indicated in FIG. 2B, within the computer system 300 a memory 400 includes an operating system 410 and a computer game application 450 that is executable by the computer system's processing unit. A mobile telephony module 460 corresponding to the computer game application 450 (a) facilitates or establishes bidirectional communication with the mobile telephone 100; (b) communicates mobile telephony commands and associated data to the mobile telephone 100, such that the mobile telephony commands can be executed and corresponding mobile telephony operations can occur; and (c) receives telephone call notifications, telephone call content/signals, message notifications, and message content/data from the mobile telephone 100. In some embodiments, the mobile telephony module 460 can additionally send requests to the mobile telephone 100 for one or more types of information or data, such as contacts list data stored within or otherwise accessible to the mobile telephone 100. In various embodiments, the mobile telephony module 460 facilitates or effectuates the performance of mobile telephony/messaging operations by way of processing or handling one or more sets of mobile calling or messaging processing events, which can be initiated in response to mobile telephone call or message receipt, gamer input (e.g., requesting incoming call connection, outgoing call initiation, call disconnection, message presentation, or message sending), or call/message information communication (e.g., voice signal or message content transfer).

The mobile telephony module 460 can be implemented in various manners, for instance, as a software component such as an add-on to the computer game application 450. As a result, the mobile telephony module 460 can be loaded for execution as part of a computer game application loading process associated with computer game application execution, such that the mobile telephony module 460 can provide (e.g., on a selective, selectable, and/or configurable basis) mobile telephony/messaging icons and associated mobile telephony/messaging windows in-game, as part of the game play environment (e.g., within portions of the visual game environment 350) corresponding to or generated by the computer game application 450.

In various embodiments, once the mobile telephone's remote calling/messaging application 260 is initialized and running, it can attempt to establish initial communication with a computer game application's corresponding mobile telephony module 460. Additionally or alternatively, once the computer game application 450 and its corresponding mobile telephony module 460 are initialized and running, the mobile telephony module 460 can attempt to establish initial communication with a remote calling/messaging application 260. In some embodiments, after such initial communication has been established, the remote calling/messaging application 260 can transfer one or more portions of a contacts list (e.g., an entire contacts list, or a "favorites" segment of the contacts list) to the computer system 300, for instance, in the event that the mobile telephone's contacts list had not been previously transferred to the computer system 300, or a computer system resident version of the mobile telephone's contacts list is out-of-date, either automatically or in response to a mobile telephony module request. During computer game application execution, the mobile telephony module 460 and the remote calling/messaging application 260 can facilitate the selective, selectable, and/or configurable provision or performance of particular mobile telephony operations or functions within the visual game environment 350 and/or audio game environment, in an essentially or substantially seamless manner with respect to the progressive or dynamic processing computer game application events (e.g., updating the visual environment 350 and/or audio game environment) and the gamer's overall in-game perception or experience.

Figure 3A:
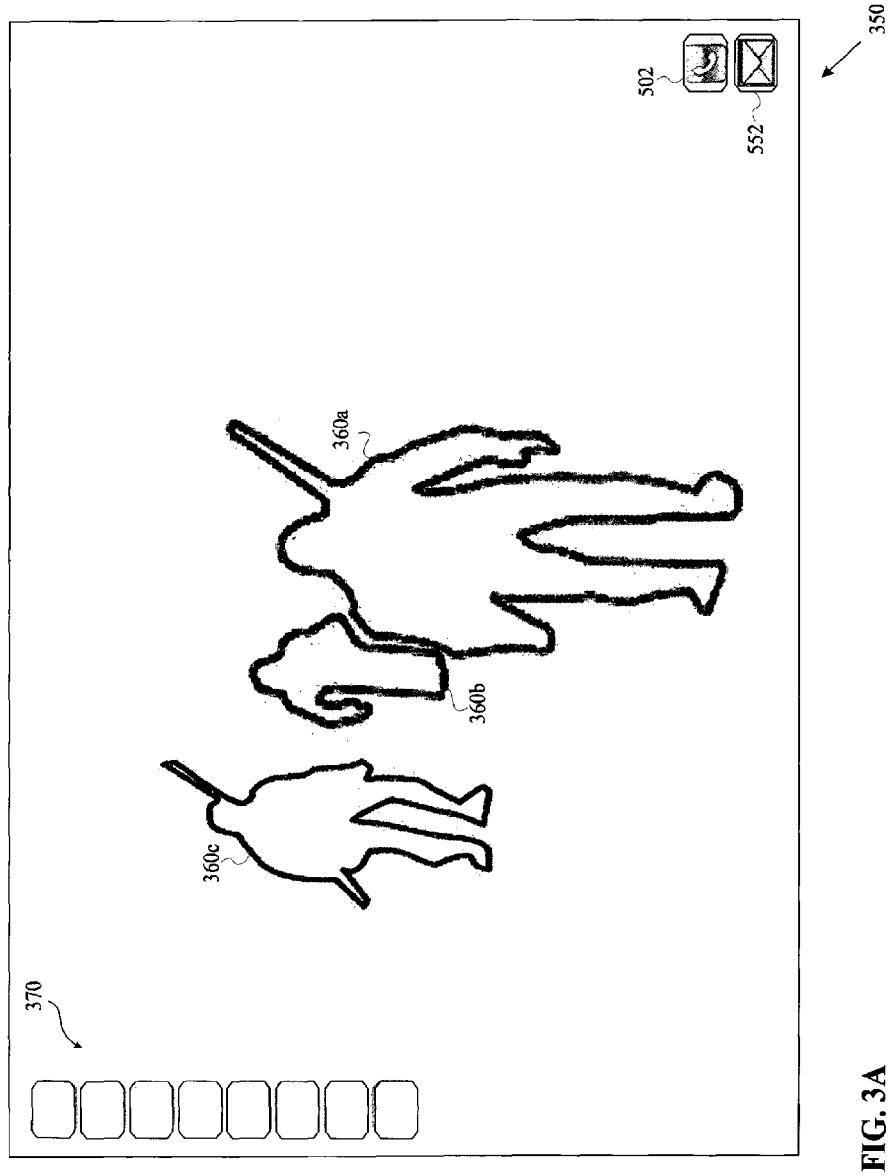
FIGS. 3A-3H are schematic illustrations showing various representative types of mobile telephony/messaging icons and associated mobile telephony/messaging windows that can be provided or presented within a visual game environment during game play by way of program instructions corresponding to an executing computer game application in accordance with an embodiment of the present disclosure.

FIGS. 3A-3H are schematic illustrations showing various representative types of mobile telephony/messaging icons and associated mobile telephony/messaging windows that can be provided or presented within a visual game environment 350 during game play by way of program instructions corresponding to an executing computer game application in accordance with an embodiment of the present disclosure. As shown in FIG. 3A, in an embodiment, when a mobile telephone call is not currently incoming or underway, and when unread sms or mms messages have not been received and a new sms or mms message is not presently being generated, the mobile telephony module 460 provides a call icon 502 and/or a compose message icon 552 within the visual game environment 350, where each such icon is user-selectable (e.g., by way of an input device such as a mouse, keyboard, or game controller).

Figure 3B:
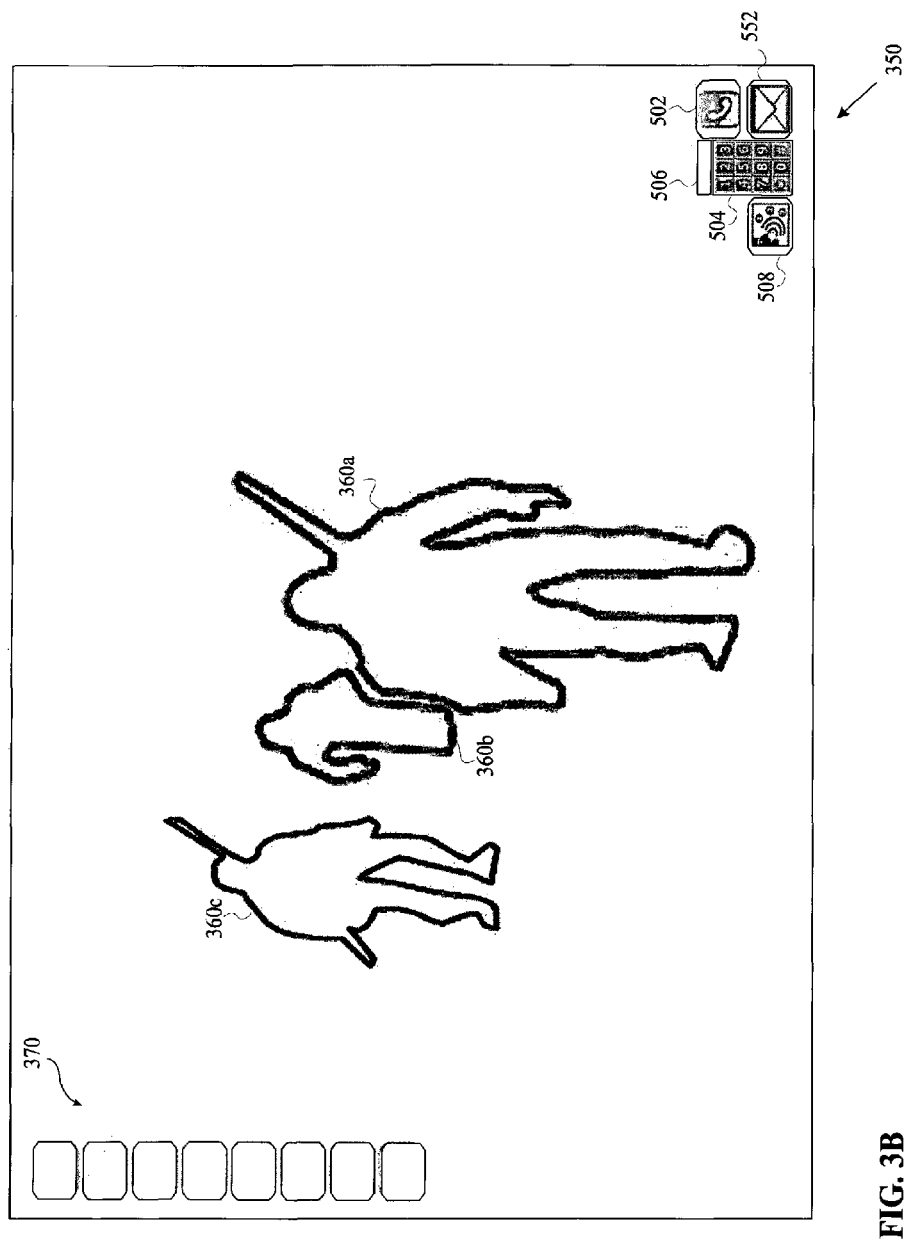

In response to gamer selection of the call icon 502 of FIG. 3A, the mobile telephony module 460 can provide a telephone dial pad 504, a corresponding telephone number/contact name window 506, and possibly a voice dialing icon 508 within the visual game environment 350, in a manner schematically illustrated in FIG. 3B in accordance with an embodiment of the present disclosure. Such a telephone dial pad 504 is responsive to gamer input for entry of a telephone number, which can be displayed within the telephone number/contact name window 506. In some embodiments, the computer system 300 can request one or more portions of a contacts list from the mobile telephone 100 (e.g., automatically after initial communication with the mobile telephone 100 has been established, or in response to a first selection of the call icon 502). The mobile telephone 100 can transfer the contacts list or portions thereof to the computer system 300, which can store the contacts list in its memory 400. In response to textual gamer input directed to the telephone number/contact name window 506 (e.g., by way of a computer keyboard or keypad), the computer system 300 can search (e.g., on a dynamic basis) for matches between text entered into the telephone number/contact name window 506 and alphanumeric data (e.g., names) within the contacts list to identify an individual or destination that the gamer intends to call, in a manner understood by one of ordinary skill in the art.

Following the entry of a target telephone number or identification of a contact name and its associated target telephone number, in response to gamer selection of the call icon 502 the mobile telephony module 460 can issue a call command along with the target telephone number to the mobile telephone's remote calling/messaging application 260. The remote calling/messaging application 260 can pass the call command and the target telephone number to the mobile operating system 210, which can initiate or attempt to establish a telephone call to the target telephone number. The mobile operating system 210 can pass call progress/status signals (e.g., a ringtone or a busy signal) and in-call signals (e.g., answered call voice signals, and possibly a current call duration) back to the remote calling/messaging application 260, which can further communicate these signals to the computer game application's mobile telephony module 260. The mobile telephony module 260 outputs or presents call progress/status signals and in-call signals to the gamer. For instance, the mobile telephony module 260 outputs in-call voice signals to computer system's speaker(s) 320.

In embodiments that provide a voice dialing icon 508, in response to voice dialing icon selection the mobile telephony module 460 can record gamer speech received by the computer system's microphone 330. Recorded speech data can include a dial instruction and an associated telephone number or contact name; for instance, representative speech data can be "dial 5555-5555" or "call John Doe." The computer game application's mobile telephony module 260 can transfer recorded speech data to the mobile telephone's remote calling/messaging application 260, which can pass such speech data to the speech processing/recognition application 265. The speech processing/recognition application can facilitate or effectuate speech data processing and the generation of a corresponding call command and the identification of a corresponding telephone number, for instance, in association with a remote or cloud-based speech processing service. The call command and telephone number can be transferred to the mobile operating system 210, which can establish or attempt to establish the telephone call. As described above, the mobile operating system 210 can pass call progress/status signals (e.g., a ringtone or a busy signal) and in-call signals (e.g., answered call voice signals, and possibly a current call duration) to the remote calling/messaging application 260, which can transfer such signals to the computer game application's mobile telephony module 260. The mobile telephony module 260 outputs or presents call progress/status signals and in-call signals to the gamer. In some embodiments, voice dialing is automatically supported, or selectively enabled by way of a configuration interface, such that when the call icon 502 is selected and entry of a telephone number or contact name is expected, voice signal recording can automatically occur (e.g., in response to the detection of audio input received by the computer system's microphone 330). In such embodiments, a separate voice dialing icon 508 need not be presented within the visual game environment 350.

Figure 3C:
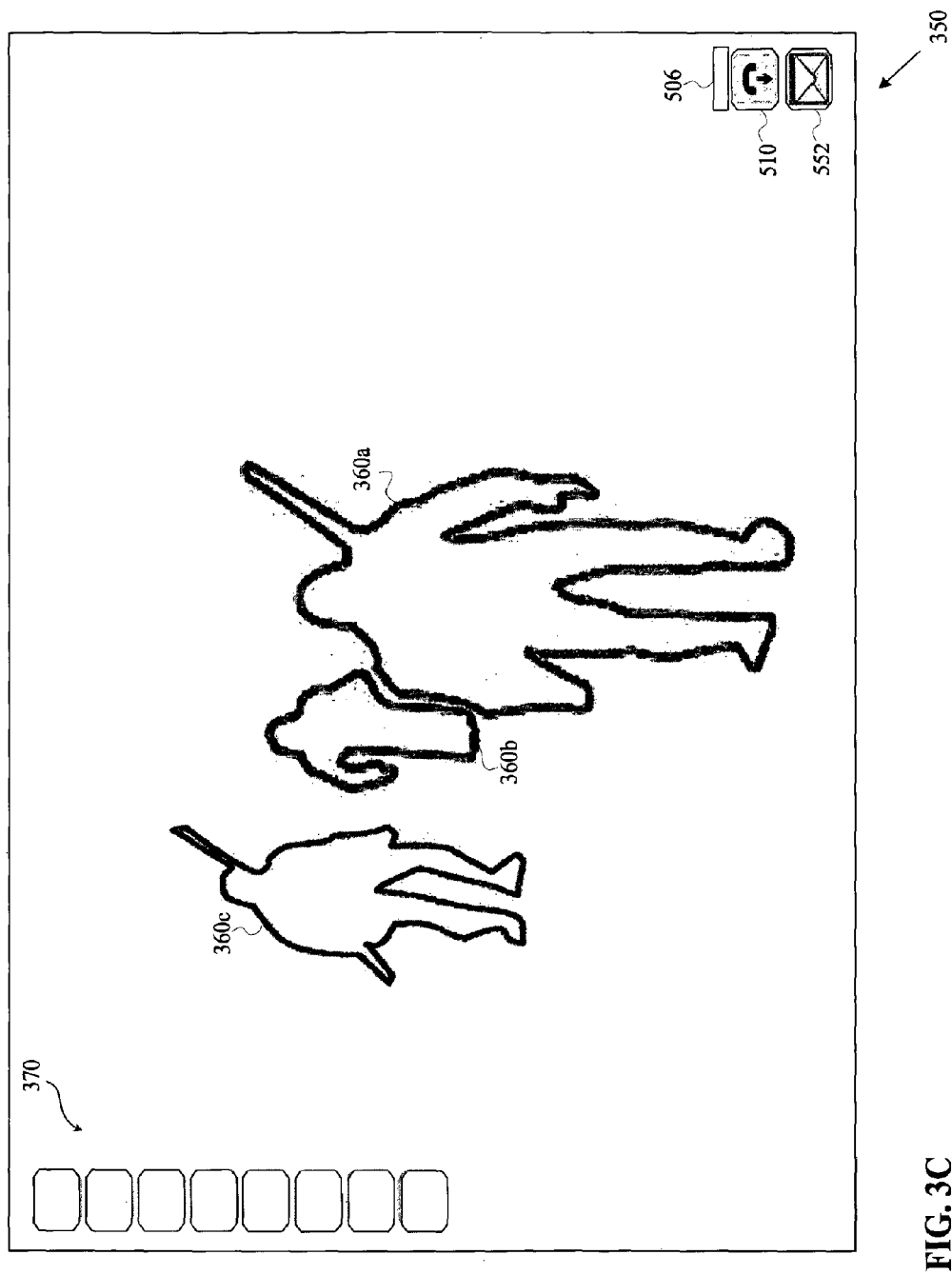

As indicated in FIG. 3C, once a telephone call is in progress, the mobile telephony module 260 can update the visual mobile telephony/messaging interface 500, for instance, by removing the dial pad 504 and replacing the call icon 502 with another icon, such as a disconnect icon 510 having a different visual appearance than the call icon 502. The mobile telephony module 260 can further (re)position the telephone number/contact name window 506, for instance, above the disconnect icon 510, such that the telephone number or contact name corresponding to a currently ongoing call is displayed to the gamer during the call. The mobile telephony module 460 can additionally display call data, such as a current call duration, as part of the visual mobile telephony/messaging interface 500.

Finally, in response to gamer selection of the disconnect icon 510, the mobile telephony module 460 issues a disconnect call command to the mobile telephone's remote calling/messaging application 260, which passes the disconnect call command to the mobile operating system 210 such that the current call can be terminated. The mobile telephony module 460 can subsequently (re)display the call icon 502 instead of the disconnect icon 510 within the visual game environment 350, remove the telephone number/contact name window 506 from the visual game environment 350, and remove call duration data from the visual game environment 350.

Figure 3D:
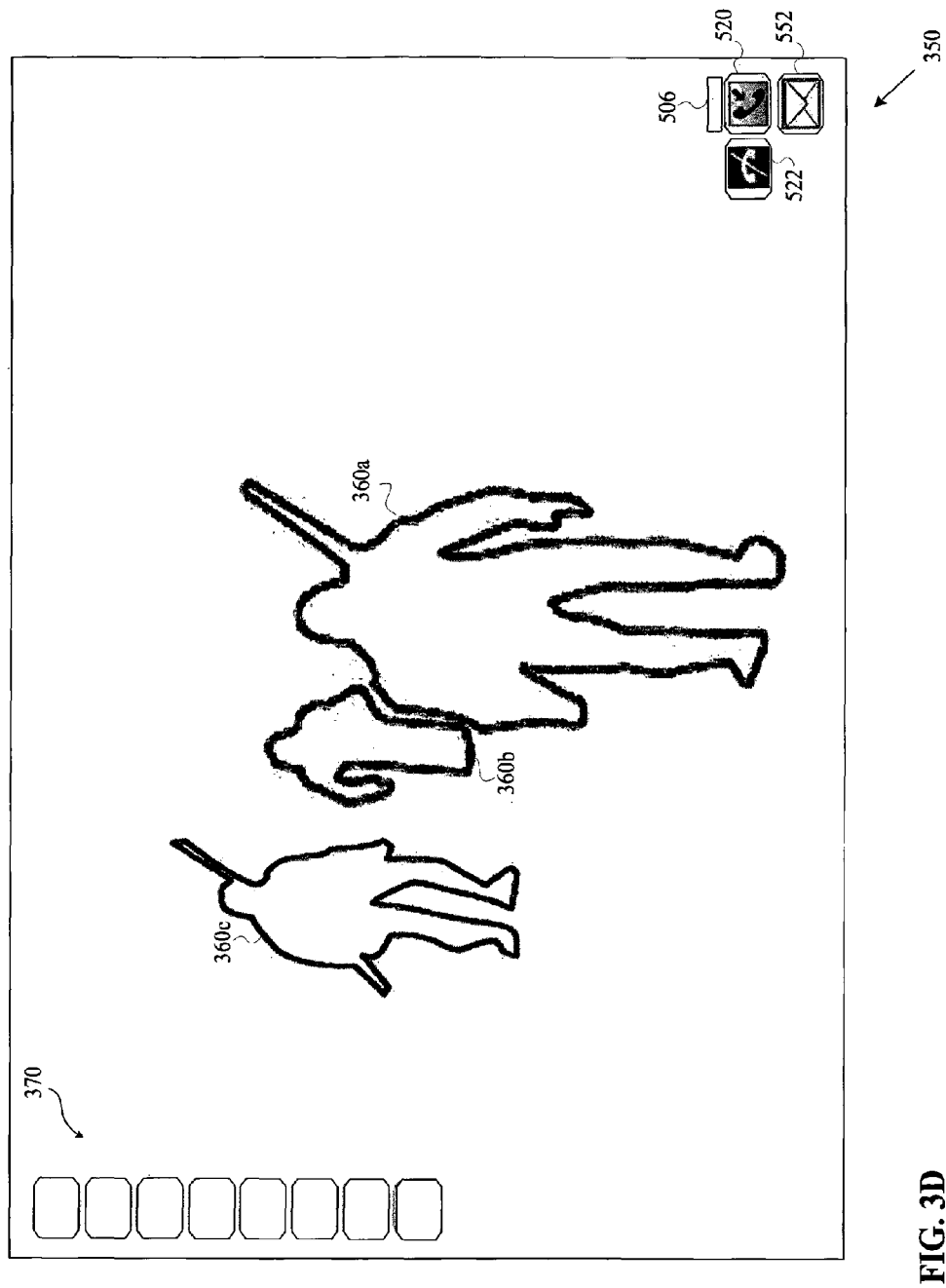
Figure 3E:
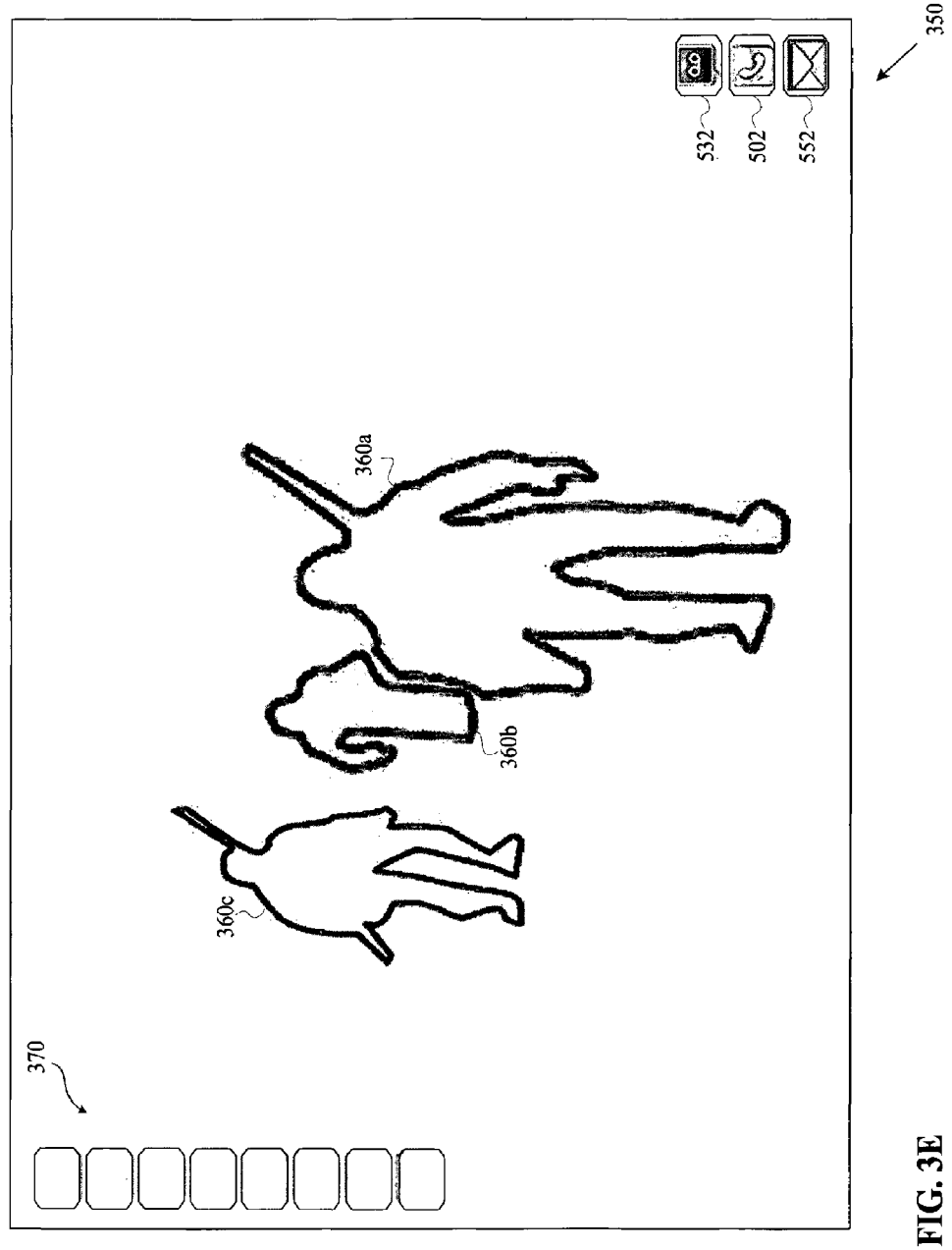
Figure 3F:
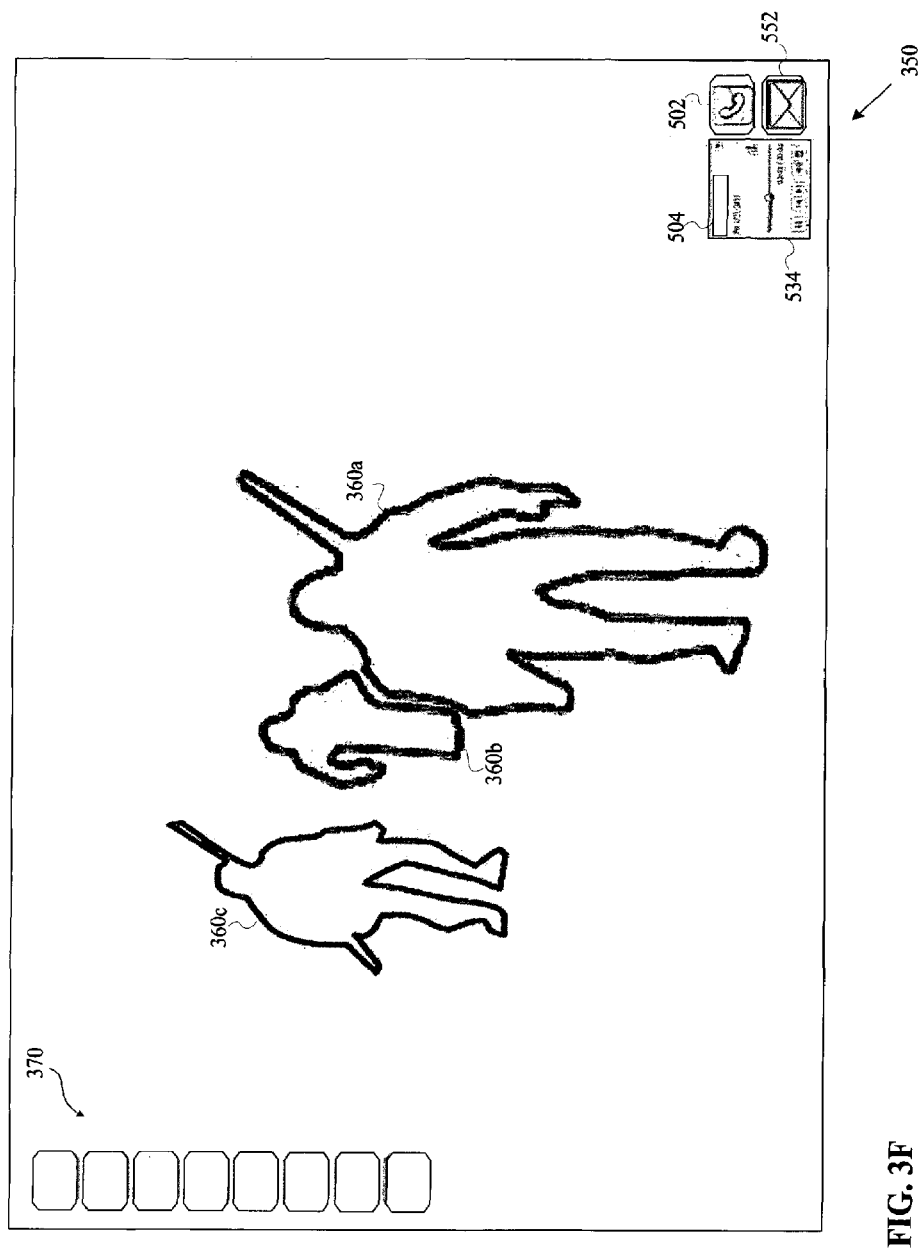

If during game play the mobile telephone 100 receives an incoming call, the mobile operating system 210 can communicate an incoming call notification, including incoming call data such as an incoming call telephone number and/or contact name, to the mobile telephone's remote calling/messaging application 260. The remote calling/messaging application 260 can correspondingly communicate the incoming call notification to the computer game application's mobile telephony module 460, which can update the visual mobile telephony/messaging interface 500 within the visual game environment 350 to indicate that an incoming call is available which can be answered, rejected, or ignored. For instance, as indicated in FIG. 3D, the mobile telephony module 460 can present a telephone number/contact name window 506 and the telephone number or contact name corresponding to the incoming call, as well as each of an incoming call icon 520 and a reject call icon 522, within the visual game environment 350, such that the gamer is visually alerted to the existence of an incoming call. The mobile telephony module 460 can also output a ringtone signal corresponding to the incoming call to the computer system's speaker(s) 320, such that the gamer is also alerted to the incoming call by an audio signal.

In some embodiments, the audio characteristics of the ringtone signal can depend upon the telephone number or contact name corresponding to the incoming call. In such embodiments, the mobile telephone's remote calling/messaging application 260 can transfer a set of ringtone identifiers and corresponding ringtone audio signals to the computer system 300 after initial communication between the remote calling/messaging application 260 and the computer game application's mobile telephony module 460 has been established. The remote calling/messaging application 260 can further communicate a ringtone identifier corresponding to an incoming call to the mobile telephony module 460 as part of incoming call data.

In response to gamer selection of the incoming call icon 520, the mobile telephony module 460 issues an answer call command to the mobile telephone's remote calling/messaging application 260, which passes the answer call command to the mobile operating system 210 such that the incoming call can be answered. The mobile operating system 210 transfers in-call signals including voice signals and possibly associated signals such as a current call duration to the remote calling/messaging application 260, which communicates the in-call signals to the computer game application's mobile telephony module 460. The mobile telephony module 460 can output voice signals to the computer system's speaker(s), output the corresponding telephone number/contact name to a telephone number/contact name window 506, possibly present other call information such as a current call duration within the visual mobile telephony/messaging interface 500, and update icons within the visual mobile telephony/messaging interface 500 in a manner analogous or identical to that described above with reference to FIG. 3C.

If during an incoming call the gamer selects the reject call icon 522, the mobile telephony module 460 can issue a reject call command to the mobile telephone's remote calling/messaging application 260, which can pass the reject call command to the mobile operating system 210 such that the call can remain unanswered or otherwise be rejected (e.g., answered by a voice messaging system). The mobile telephony module 460 can additionally terminate the output of the ringtone signal to the computer system's speaker(s) 320. Finally, the mobile telephony module 460 can update the mobile telephony/messaging interface 500 within the visual game environment in a manner analogous or identical to that described above with reference to FIG. 3A.

In the event that a voice message has been received during game play, for instance, as a result of gamer rejection of an incoming call, in some embodiments the mobile telephone's remote calling/messaging application 260 can communicate a voice message notification to the computer game application's mobile telephony module 460. The mobile telephony module 460 can correspondingly present a new voice message icon 532 as part of the visual mobile telephony/messaging interface 500. In response to gamer selection of the new voice message icon 532, the mobile telephony module 460 can issue a voice message playback command to the mobile telephone's remote calling/messaging application 260. The remote calling/messaging application 260 can communicate with the mobile operating system 210 to log into the gamer's voice mail account, and select new message playback.

During the playback of the new message from a voice messaging system to the mobile telephone 210, the mobile operating system 210 can pass voice message signals to the remote calling/messaging application 260, which can transfer the voice message signals to the computer game application's mobile telephony module 460. The mobile telephony module 460 can present a voice message playback interface 534 as part of the visual mobile telephony/messaging interface 500, which can include a telephone number/contact name window 506 that identifies the source of the voice message; a set of gamer selectable voice message playback controls such as play/resume, pause, stop, and message discard controls, and possibly a message playback progress indicator.

In several embodiments following the mobile telephony module's presentation of the voice message playback interface 534 and receipt of at least some voice message information from the remote calling/messaging application 260, the mobile telephony module 460 automatically initiates voice message playback by outputting received voice message signals to the computer system's speaker(s), while additional voice message information can be received and buffered within the computer system's memory 400 in a manner understood by one of ordinary skill in the relevant art. In response to gamer selection of voice message pause, resume, rewind, or fast forward, the mobile telephony module 460 can perform the selected command in accordance with the amount of buffered voice message data received from the remote calling/messaging application 260. In response to gamer selection of a voice message delete command, the mobile telephony module communicates a delete voice message command to the mobile telephone's remote calling/messaging application 260, which further communicates the delete voice message command to the mobile operating system 210 such that the delete voice message command can be output to and processed by the voice messaging system in which the voice message resides.

As indicated above, various embodiments in accordance with the present disclosure can additionally or alternatively support the in-game communication of sms and/or mms messages between a mobile telephone network and an executing computer game application, and the provision of a set of messaging functions to the gamer while in-game. For instance, in a representative embodiment, in response to gamer selection of the compose message icon 552 of FIG. 3A, the mobile telephony module 460 presents a message composition interface 560 as part of the visual mobile telephony/messaging interface 500, in a manner schematically illustrated in FIG. 3G in accordance with an embodiment of the present disclosure.

The message composition interface 560 can include a message destination interface 562; a message composition window 568; possibly a gamer selectable voice recognition/speech-to-text icon 570; and a send message icon 572. The message destination interface 562 facilitates gamer specification or identification of one or more destinations to which a message presently under consideration is to be sent. In general, a message destination can be a mobile telephone number, or a textual identifier (e.g., a name) corresponding to a contacts list entry. In an embodiment, the message destination interface 562 includes at least one destination number/name window 564 in which a message destination can be entered/displayed; a gamer selectable add destination icon; and a gamer selectable search contacts list icon 566. In a manner essentially identical or analogous to that provided by commercially available mobile telephone user interfaces, gamer selection of the add destination icon 565 results in the mobile telephony module 460 providing an additional destination number/name window 564 within the message destination interface 562; and gamer selection of the search contacts list icon 566 results in the mobile telephony module 460 presenting a contacts list search/selection interface (not shown).

The message composition window 568 is responsive to alphanumeric gamer input (e.g., as received by a keyboard or keypad) for defining message content. In an embodiment, gamer selection of the voice recognition/speech-to-text icon 570 causes the mobile telephony module 460 to buffer or record gamer speech; perform a set of operations directed to converting such speech into textual message content; and display textual message content corresponding to recorded gamer speech in the message composition window 568. In a number of embodiments, conversion of speech to text can occur by way of the speech processing/recognition application executing on the mobile telephone 100, in which case the mobile telephony module 460 transfers recorded gamer speech data (e.g., received by way of the computer system's microphone 330) to the mobile telephone's speech processing/recognition application 265, for instance, by way of the mobile telephone's remote calling/messaging application 260. The speech processing/recognition application 265 can pass such recorded speech data to a remote or cloud based speech processing/recognition service for conversion to textual data. Textual data corresponding to converted speech is subsequently communicated to the remote calling/messaging application 260, and then transferred to the mobile telephony module 460 for display within the message composition window 568. In such an embodiment, the mobile telephone 100 can be configured for communicating with the mobile network 50 as well as an additional network such as the Internet, from which cloud based speech processing/recognition services can be accessed.

In response to gamer selection of the send message icon 572, the mobile telephony module 460 generates a send message command, which includes a set of message destinations and the message content within the message composition window 568. The mobile telephony module 460 communicates the send message command to the remote calling/messaging application 260, which passes the send message command to the mobile telephone's mobile operating system 210 such that the message can be sent to the specified message destination(s). After the message has been sent, the mobile telephony module 460 can update the visual mobile telephony/messaging interface 500, for instance, to have a visual appearance such as that shown in FIG. 3A.

With respect to mobile telephone receipt of a new incoming message, in an embodiment when the mobile telephone 100 receives a new message, the remote calling/messaging application can issue a new message notification to the mobile telephony module 460. In response, the mobile telephony module 460 can update the appearance of portions of the visual mobile telephony/messaging interface 500 presented within the visual game environment 350 to indicate that a new message has arrived. For instance, the mobile telephony module 460 can present a message received icon 554 as part of the visual mobile telephony/messaging interface 500 in a manner schematically illustrated in FIG. 3H in accordance with an embodiment of the present disclosure.

In response to gamer selection of the message received icon 554, the mobile telephony module 460 can issue a retrieve sms/mms message command to the mobile telephone's remote calling/messaging application 260, which communicates with the mobile operating system 210 to retrieve the new incoming message, and transfer the new incoming message to the mobile telephony module 460. In association with issuance of the retrieve sms/mms message command and/or receipt of the new incoming message from the remote calling/messaging application 260, the mobile telephony module 460 can update the visual mobile telephony/messaging interface 500 to include a message display interface 580, for instance, in a manner schematically indicated in FIG. 3H. In an embodiment, the message display interface 580 includes a message source window 582 for displaying a telephone number and/or contact name from which the new incoming message was received; a message contents window 584 for displaying the contents of the new incoming message (e.g., visual message data, such as text, graphics, and/or imagery); possibly a text-to-speech icon 586, and a reply-to-message icon 588.

In an embodiment, in response to gamer selection of the text-to-speech icon 586, the mobile telephony module 460 can issue a convert to speech command to the remote calling/messaging application 260, which passes the new incoming message to the mobile telephone's speech processing/recognition application 265. The speech processing/recognition application 265 can facilitate the conversion of message text into speech, for instance, by passing textual message data to a remote or cloud-based speech processing system configured for generating speech/audio data corresponding to the textual message data in a manner understood by one of ordinary skill in the relevant art. Following the generation of such speech data, the cloud-based speech processing system can transfer the speech data back to the speech processing/recognition application 265, which passes the speech data to the remote calling/messaging application 260. The remote calling/messaging application 260 can transfer this speech data to the computer game application's mobile telephony module 460, which can output such speech data to the computer system's speaker(s) 320.

Figure 3G:
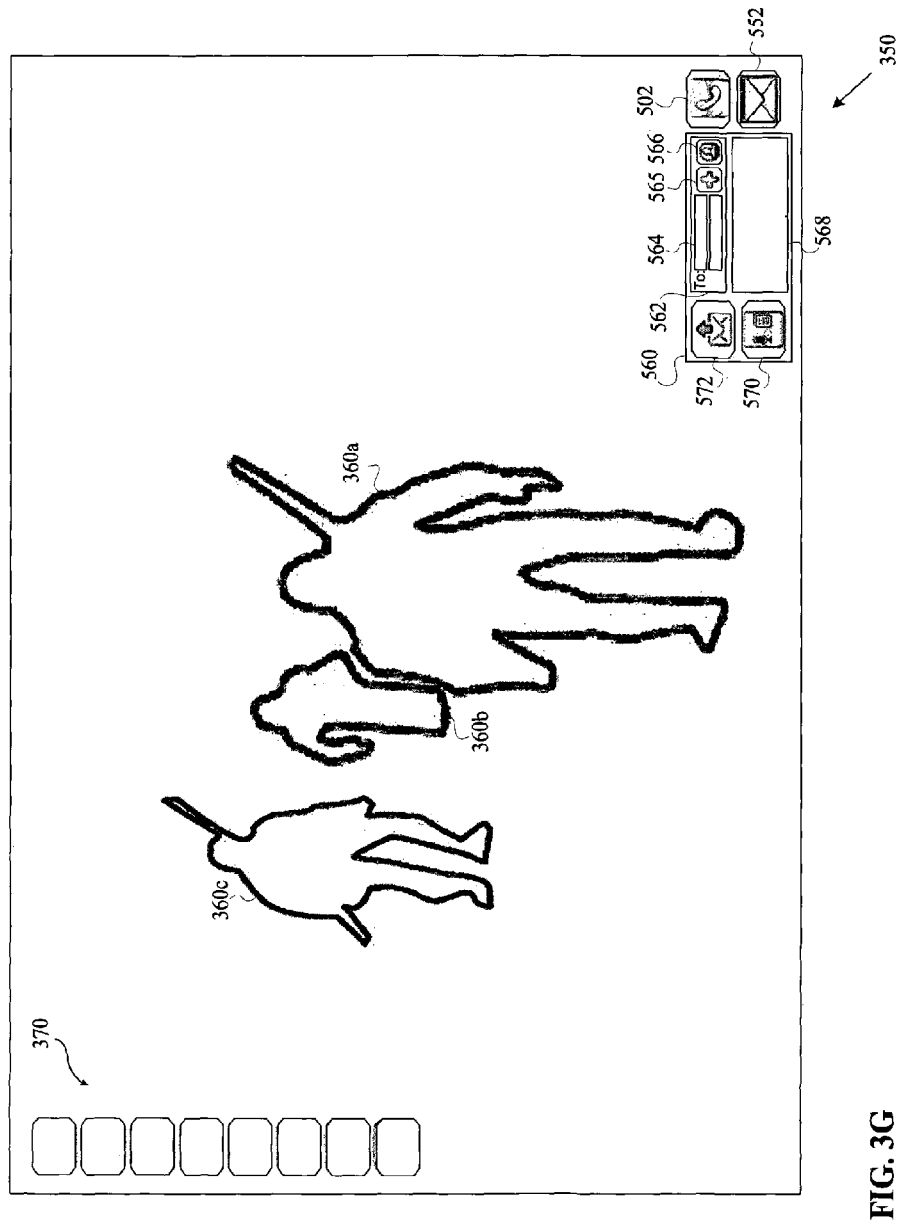
Figure 3H:
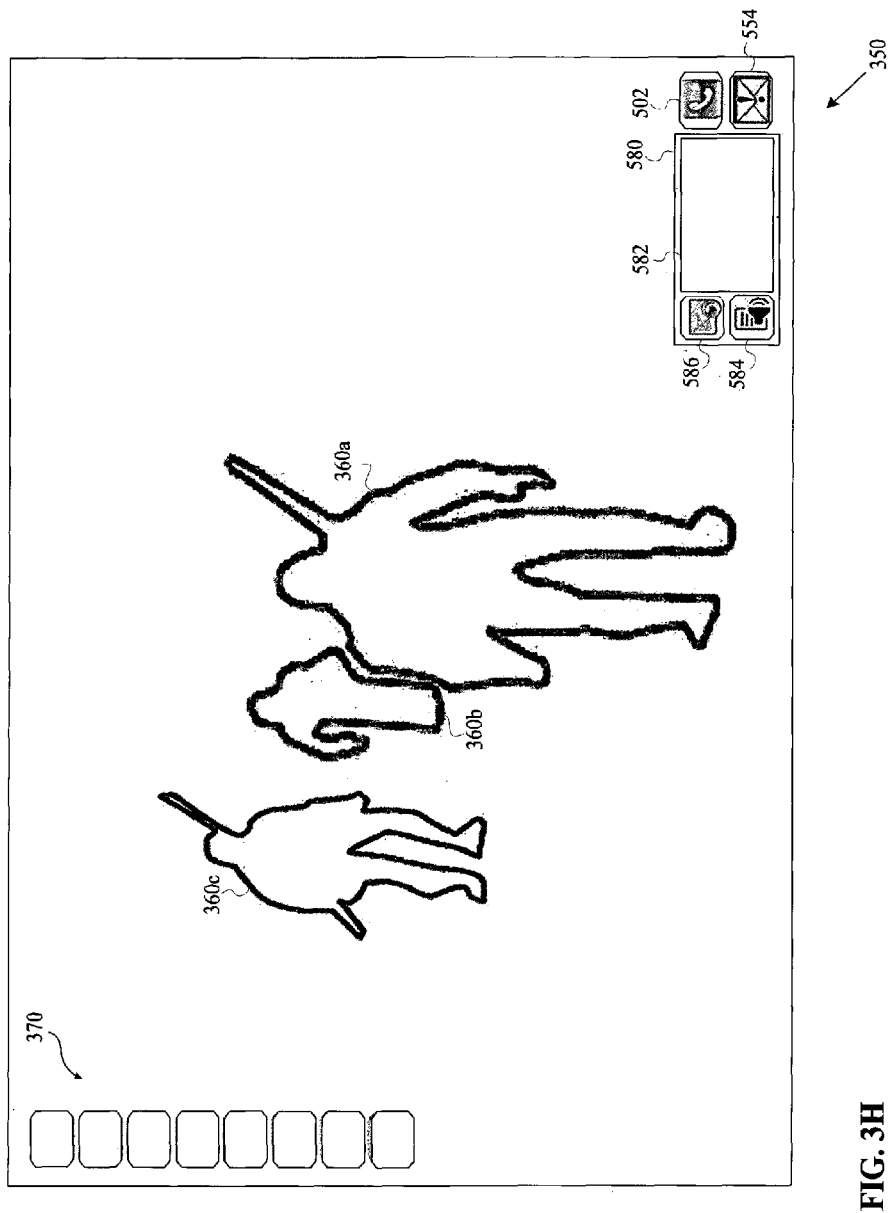

Finally, in response to gamer selection of the reply-to-message icon 588, the mobile telephony module 260 can update the visual mobile telephony/messaging interface 500, for instance, in a manner substantially identical or analogous to that shown in FIG. 3G.

Figure 4:
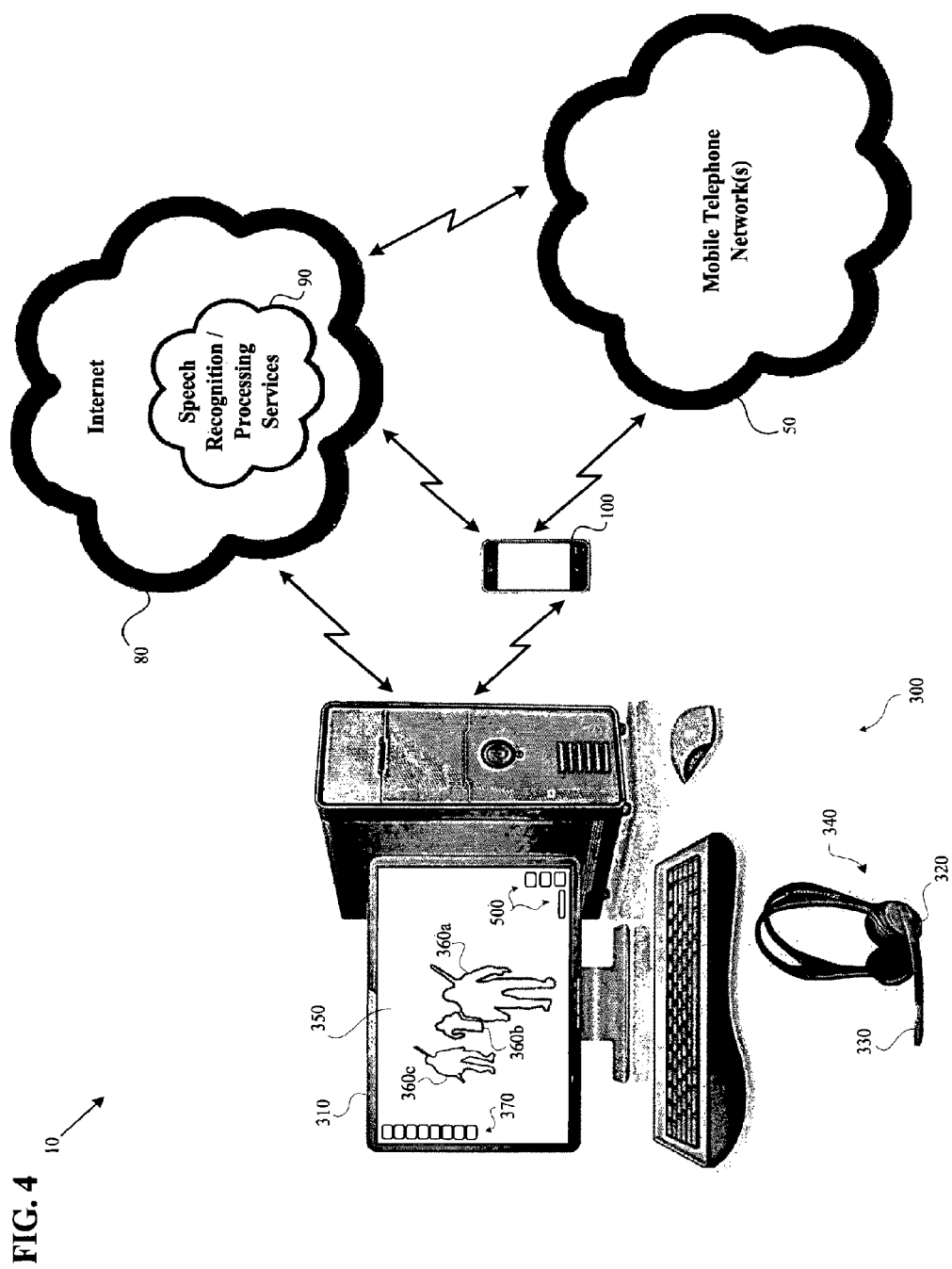
FIG. 4 is a schematic illustration of a system for interfacing at least one mobile telephone with a distinct or separate computer system configured for performing mobile telephone calling and/or mobile telephone messaging operations from within the execution context of a computer game application executing on the computer system in accordance with another embodiment of the present disclosure.
Figure 5A:
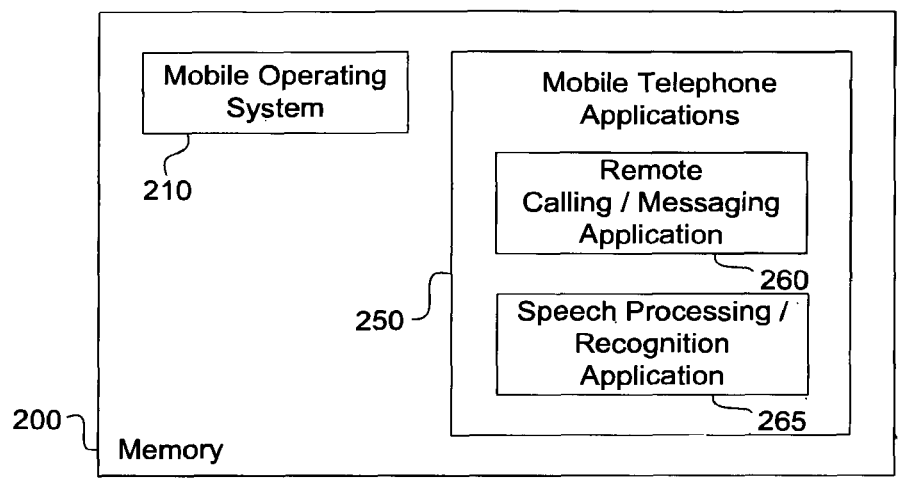
FIGS. 5A-5B are schematic illustrations showing aspects of particular representative program instruction sets corresponding to a mobile telephone and a computer system, respectively, in accordance another embodiment of the present disclosure.
Figure 5B:
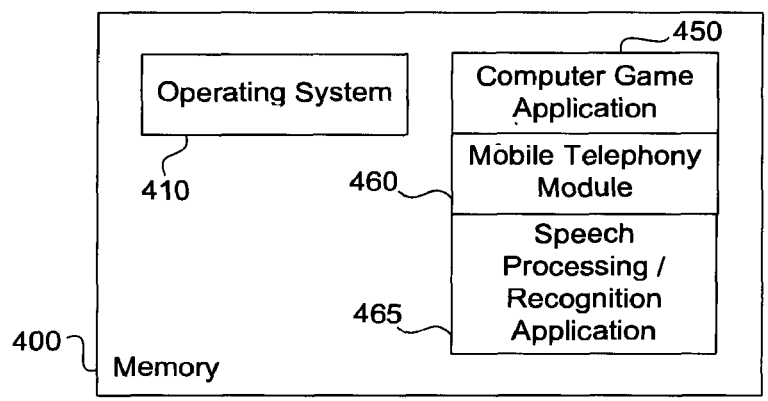

In certain embodiments configured for providing or performing particular mobile telephony/messaging operations or functions by way of speech processing/recognition, one or more program instruction sets configured for facilitating or enabling speech processing/recognition can reside within the computer system's memory 200. For instance, FIG. 4 is a schematic illustration of a system 10 for interfacing at least one mobile telephone 100 with a distinct or separate computer system 300 configured for performing mobile telephone calling and/or mobile telephone messaging operations from within the execution context of a computer game application executing on the computer system 300 in accordance with another embodiment of the present disclosure; and FIGS. 5A-5B are schematic illustrations showing aspects of particular representative program instruction sets corresponding to the mobile telephone 100 and the computer system 300, respectively, in accordance such an embodiment of the present disclosure.

In an embodiment, the computer system's memory 400 includes a speech processing/recognition module 465, which can be implemented as an add-on that is loaded in association with a computer game application loading process associated with computer game application execution. In this type of embodiment, one or more types of speech processing/recognition operations or functions can be facilitated or effectuated by way of direct communication between the computer game application's speech processing/recognition module 465 and a cloud based speech processing/recognition service 90 that is accessible by way of the Internet 80.

Figure 6A:
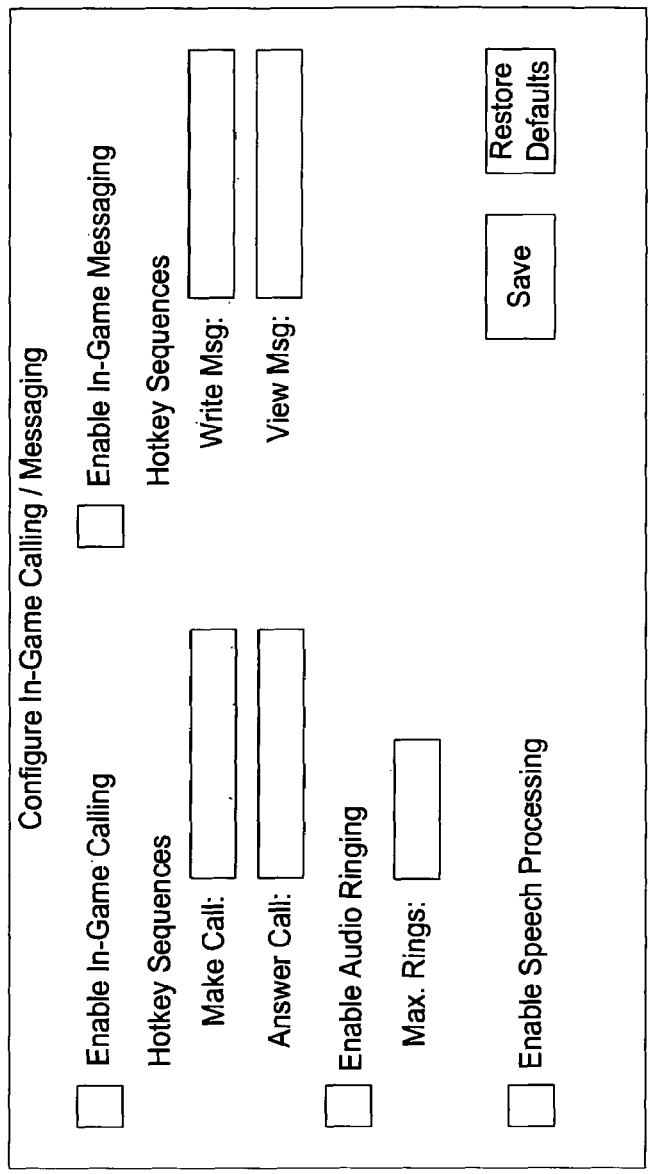

FIGS. 6A and 6B are schematic illustrations of representative mobile telephony/messaging configuration interfaces 600 in accordance with embodiments of the present disclosure, by which a gamer can selectively configure or customize aspects of in-game mobile telephony/messaging operations supported or provided by the mobile telephony module 460. A mobile telephony/messaging configuration interface 600 can be activated or presented to the gamer in one or more manners, for instance, in response to a gamer input (e.g., received by way of a keyboard, mouse, game controller, or other input device) directed to an introductory game screen or a setup menu provided by the computer game application 450.

In an embodiment, a configuration interface 600 includes a graphical window providing a number of visual or graphical objects, elements, or widgets (e.g., check boxes, radio buttons, text boxes, list boxes, etc. . . . ) responsive to gamer input, by which the mobile telephony module 460 can determine at least some of (a) whether to provide mobile telephony calling and/or messaging operations during game play; (b) gamer selectable/programmable hotkey sequences corresponding to make call, accept call, write message, and read message operations; (c) whether to enable audio ringing/call notification; (d) a maximum number of incoming call rings or notifications (e.g., audio and/or visual notifications) to be provided to the gamer in response to an incoming call; and (e) whether to enable speech processing (e.g., voice command processing, text-to-speech, and speech-to-text) operations.

In other embodiments, a configuration interface 600 can include graphical elements responsive to user input by which the mobile telephony module 460 can selectively provide additional and/or other in-game mobile telephony and/or messaging operations. For instance, as indicated in FIG. 6B, a configuration interface 600 can include graphical objects or elements by which multiple mobile telephony/messaging configurations can be defined, where each such configuration is associated with a different gamer identifier and corresponding distinct mobile telephone number (e.g., for multi-player game situations). In such embodiments, a computer game application's mobile telephony module 460 can selectively communicate with multiple mobile telephone remote calling/messaging applications 260, each of which resides on a distinct mobile telephone 100.

Figure 7:
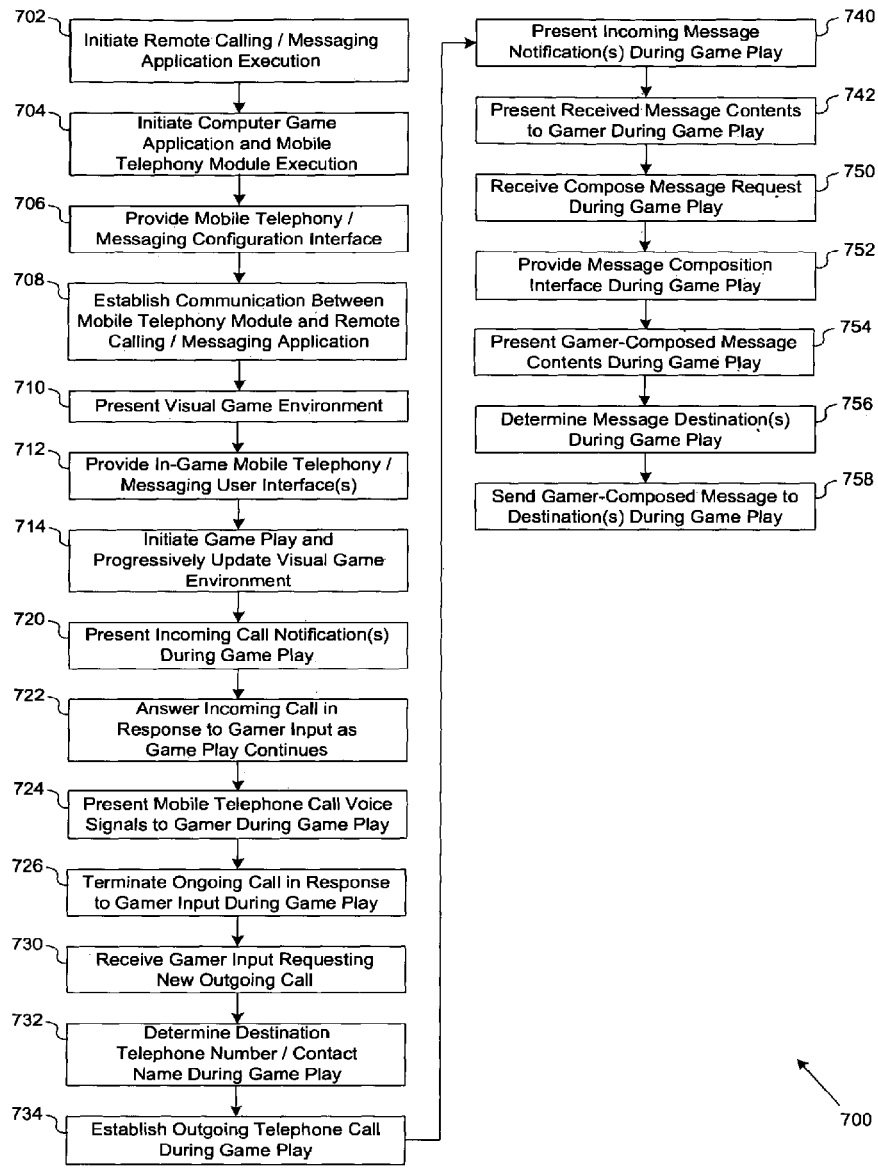
FIG. 7 is a flow diagram of a representative process for providing in-game mobile telephony/messaging operations in accordance with an embodiment of the present disclosure.

FIG. 7 is a flow diagram of a process 700 for providing in-game mobile telephony/messaging operations in accordance with an embodiment of the present disclosure. In an embodiment, the process 700 includes a first process portion 702 involving initiating the execution of a remote calling/messaging application 260 on a mobile telephone 100; a second process portion 704 involving initiating the execution of a computer game application 450 having a corresponding mobile telephony module 460 on a computer system 300; possibly a third process portion 706 involving providing a configuration interface 600 to a gamer, and selectively determining aspects of in-game mobile telephony/messaging operations that the mobile telephony module 460 provides to the gamer during game play; and a fourth process portion 708 involving establishing initial communication between the mobile telephony module 460 and the remote calling/messaging application 260 (e.g., which can include determining or verifying communication channel parameters, such as by way of a handshaking operation).

The process 700 additionally includes a fifth process portion 710 involving generating or presenting a visual game environment 350 to the gamer, and a sixth process portion 712 involving providing an in-game mobile telephony/messaging interface to the gamer during game play. Such an interface can include a visual mobile telephony/messaging interface 500 and/or an audio mobile telephony/messaging interface, and is responsive to gamer input (e.g., corresponding to finger/hand movements, gamer gestures, or gamer speech) directed to an input device. The process 700 also includes a seventh process portion 714 involving initiating game play, and progressively or dynamically updating the visual game environment 350 in accordance with game events during game play.

With respect to calling operations, the process 700 includes an eighth process portion 720 involving notifying the gamer of an incoming mobile telephone call during game play by way of a set of visual/graphical objects or elements presented within or upon portions of the visual game environment 350, and/or a set of audio call notification signals, as game play occurs and the visual game environment 350 is correspondingly progressively or dynamically updated in accordance with game play events. The process 700 correspondingly includes a ninth process portion 722 involving communication between the mobile telephony module 460 and the remote calling messaging application 260 to answer the incoming mobile telephone call in response to gamer input received during game play; a tenth process portion 724 involving exchanging mobile telephone call voice signals and possibly call status information between the mobile telephone's remote calling/messaging application 260 and the computer game application's mobile telephony module 460, and presenting mobile telephone call voice signals to the gamer during game play; and an eleventh process portion 726 involving terminating an ongoing mobile telephone call in response to gamer input received during game play.

The process 700 also includes a twelfth process portion 730 involving receiving gamer input directed to establishing an outgoing mobile telephone call by way of the visual mobile telephony/messaging interface 500 or an audio mobile telephony/messaging interface during game play; a thirteenth process portion 732 involving identifying or determining a telephone number or contact name for the outgoing mobile telephone call by way of visual/graphical or audio gamer input; and a fourteenth process portion 734 involving initiating or establishing an outgoing mobile telephone call by way of communication between the computer game application's mobile telephony module 460 and the mobile telephone's remote calling/messaging application 260 in response to gamer input. Once an outgoing mobile telephone call has been initiated or established, voice signals and possibly call status signals can be presented to the gamer during game play. Also, an ongoing mobile telephone call can be terminated in response to gamer input.

Mobile telephone calling operations such as those described herein (e.g., including providing visual telephony interface elements to the gamer, processing mobile telephone call related gamer input, answering incoming telephone calls, initiating/establishing outgoing telephone calls, providing telephone call voice/status signals to the gamer, and terminating active/ongoing calls) occur in a substantially or essentially seamless manner as the computer game application 450 progressively or dynamically updates the visual game environment 350 in response to the occurrence of game events. Thus, relative to the gamer's sensory perception (e.g., visual and auditory perception), the mobile telephony module's handling of mobile telephone calling events in support of mobile telephony operations occurs in a simultaneous or essentially simultaneous manner with respect to the computer game application's game event processing and visual game environment updates. The gamer therefore perceives essentially or substantially no interruption, or negligible/minimal interruption, to their game play activities and in-game experience while receiving or making mobile telephone calls during game play. Consequently, in various embodiments, the mobile telephony module's handling of mobile telephony events in support of mobile telephony operations occurs in accordance with predetermined time constraints relative to a video or graphics frame update rate associated with visual game environment updates. In a number of embodiments, satisfaction of such time constraints can be facilitated by a computer system 300 that includes specialized or dedicated visual/graphics processing resources in addition to general purpose processing resources.

With respect to messaging operations, the process 700 includes a fifteenth process portion 740 involving presenting an in-game incoming or new message notification to the gamer, by way of the visual mobile telephony/messaging interface 500 and/or an audio mobile telephony/messaging interface; and a sixteenth process portion 742 involving presenting corresponding received sms or mms message contents to the gamer while in-game, in response to gamer input received by way of the visual mobile telephony/messaging interface 500 or an audio mobile telephony/messaging interface.

The process 700 also includes a seventeenth process portion 750 involving receiving a compose message request corresponding to gamer input during game play, an eighteenth process portion 752 involving providing a new message composition interface or window to the gamer in response to visual/graphical or speech based gamer input received during game play; a nineteenth process portion 754 involving presenting gamer-composed message contents within the new message composition interface as the gamer composes a message during ongoing game play; and a twentieth process portion 756 involving determining or identifying a set of message destinations or mobile telephone numbers to which the gamer-composed message is to be sent. The process 700 correspondingly includes a twenty first process portion 758 involving sending an sms or mms message to the message destination(s) in response to gamer input, by way of communication between the computer game application's mobile telephony module 460 and the mobile telephone's remote calling/messaging application 260.

In a manner identical, essentially identical, or analogous to that described above for incoming and outgoing mobile telephone calling operations, multiple embodiments in accordance with the present disclosure perform incoming and outgoing sms and/or mms messaging operations (including providing visual messaging interface elements to the gamer, responding to messaging related gamer input, presenting incoming message content, presenting gamer-composed message content, and sending messages) occur in a substantially or essentially seamless manner with respect to the gamer's sensory perception as the computer game application 450 progressively or dynamically updates the visual game environment 350 in response to game event occurrence. The gamer therefore perceives essentially or substantially no interruption, or negligible/minimal interruption, to their game play activities and in-game experience while receiving or composing/sending sms or mms messages during game play. Consequently, in a manner analogous to that described above, in various embodiments the mobile telephony module's handling of messaging events in support of messaging operations occurs in accordance with predetermined time constraints relative to a video or graphics frame update rate associated with visual game environment updates.

The foregoing representative calling operations or functions and the foregoing representative messaging operations or functions, including the issuance and transfer of call commands, call signals, message commands, and message signals, occur in-game, while the gamer is playing and continues to play the computer game, without significant or substantial perceivable or noticeable interruption to the visual flow or progress of the computer game itself (as conveyed to the gamer by a progressively or dynamically updated game play environment). Aspects of particular embodiments of the present disclosure address at least one aspect, problem, limitation, and/or disadvantage associated with approaches for performing mobile device operations or functions, such as mobile telephony/messaging operations, by way of gamer interaction with a game play environment during computer game play. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the disclosure. It will be appreciated by a person of ordinary skill in the art that several of the above-disclosed systems, components, processes, or alternatives thereof, may be desirably combined into other different systems, components, processes, and/or applications. In addition, various modifications, alterations, and/or improvements may be made to various embodiments that are disclosed by a person of ordinary skill in the art within the scope and spirit of the present disclosure. For instance, certain embodiments in accordance with the present disclosure can include a telephony module corresponding to a computer game application 450, where the telephony module includes the mobile telephony module 460 as well as a Voice over Internet Protocol (VoIP) module that can additionally or selectively make and/or receive telephone calls in-game by way of VoIP operations. Additionally or alternatively, specific embodiments can include an Internet Protocol (IP) messaging module (e.g., a Messaging over IP (MoIP) module) that can send and/or receive sms or mms messages (e.g., on a selective basis) by way of IP messaging operations. Embodiments in accordance with the present disclosure encompass these and other variations, and are limited only by the following claims.

The following examples pertain to further embodiments.

Example 1 is a method for providing mobile telephony operations provided by a mobile telephone to a computer gamer while the gamer plays a computer game by way of execution of a computer game application on a computer system, the mobile telephony operations including at least one of mobile telephone calling operations and mobile telephone messaging operations, the method comprising: providing a wireless communication interface between the mobile telephone and the computer system, the computer system being separate from the mobile telephone; providing a remote mobile application in the mobile telephone; sending at least one of mobile telephony notifications or mobile telephony content to the computer system using the remote mobile application, by way of the wireless communication interface; providing a computer game user interface responsive to input received from the gamer during execution of the computer game application, the computer game user interface presenting a game environment including a visual game environment to the gamer; providing a mobile telephony module in the computer system, the mobile telephony module configured to provide a mobile telephony user interface responsive to input received from the gamer during execution of the computer game application, the mobile telephony user interface for selectively controlling the mobile telephony operations, wherein the mobile telephony module is configured to receive the at least one of mobile telephony notifications or mobile telephony content from the mobile telephone and further configured to update the mobile telephony user interface based on the received at least one of mobile telephony notifications or mobile telephony content; and performing the mobile telephony operations by way of mobile telephony user interface in a manner that at least substantially avoids interrupting (a) gamer perception of ongoing game play, and (b) gamer interaction with the visual game environment.

In example 2, the subject matter of example 1 can optionally include that the mobile telephony operations occur at least substantially simultaneous with respect to updates of the visual game environment and processing of events in the computer game application.

In example 3, the subject matter of example 1 can optionally include the mobile telephone calling operations comprise: providing a notification of an incoming mobile telephone call to the gamer by way of the mobile telephony interface; answering an incoming mobile telephone call in response to gamer input directed to the mobile telephony interface; making an outgoing mobile telephone call in response to gamer input directed to the mobile telephony interface; and communicating mobile telephone call voice signals between the mobile telephone and a mobile telephony module corresponding to the computer game application, the mobile telephony module comprising program instructions loaded for execution in association with loading the computer game application for execution by the computer system.

In example 4, the subject matter of example 3 can optionally include that providing a notification of an incoming mobile telephone call comprises at least one of presenting a visual notification to the gamer by way of a visual object within a portion of the visual game environment and presenting an audio notification to the gamer by way of a speaker during computer game application execution.

In example 5, the subject matter of example 3 can optionally include that at least one of answering an incoming mobile telephone call and making an outgoing mobile telephone occurs in response to one of gamer selection of a visual object within a portion of the visual game environment and receipt of gamer speech directed to a microphone during computer game application execution.

In example 6, the subject matter of example 1 can optionally include that the mobile telephone messaging operations comprise: providing a notification of a newly received unread message to the gamer by way of the mobile telephony interface; composing a message in response to gamer input directed to the mobile telephony interface; communicating message content between the mobile telephone and a mobile telephony module corresponding to the computer game application, the mobile telephony module comprising program instructions loaded for execution in association with loading the computer game application for execution by the computer system; presenting message content to the gamer by way of the mobile telephony interface; and sending a message to at least one destination mobile telephone number in response to gamer input directed to the mobile telephony interface.

In example 7, the subject matter of example 6 can optionally include that providing a notification of a newly received unread message comprises at least one of presenting a visual notification to the gamer by way of a visual object within a portion of the visual game environment and presenting an audio notification to the gamer by way of a speaker during computer game application execution.

In example 8, the subject matter of example 6 can optionally include that at least one of composing a message, presenting a message, and sending a message occurs in response to one of gamer selection of a visual object within a portion of the visual game environment and receipt of gamer speech directed to a microphone during computer game application execution.

In example 9, the subject matter of example 1 can optionally include initiating execution of a remote calling/messaging application on the mobile telephone; initiating execution of the computer game application and a corresponding mobile telephony module on the computer system, wherein the mobile telephony module is loaded for execution during loading of the computer game application for execution; and establishing communication between the remote calling/messaging application and the mobile telephony module. The corresponding mobile telephony module may be the mobile telephony module.

In example 10, the subject matter of example 9 can optionally include communicating at least one of mobile telephone call information and mobile telephone message information between the remote calling/messaging application and the mobile telephony module during computer game execution; and presenting mobile telephone call information to the gamer in a manner that avoids substantially affecting a frame update rate at which visual game environment updates occur.

In example 11, the subject matter of example 1 can optionally include that the mobile telephony user interface provides at least one of a visual mobile telephony interface and an audio mobile telephony interface to the gamer during execution of the computer game application.

In example 12, the subject matter of example 11 can optionally include that the visual mobile telephony user interface comprises a set of visual objects presented within a portion of the visual game environment.

Example 13 is a system for providing mobile telephony operations to a computer gamer while the gamer plays a computer game, the system comprising: a mobile telephone configured for communication with a mobile telephone network; a computer system comprising: a processing unit; and a memory, the memory including: a computer game application executable by the processing unit, the computer game application when executed providing a computer game user interface presenting a game environment including a visual game environment to the gamer during game play; and a mobile telephony module corresponding to the computer game application, the mobile telephony module comprising program instructions loaded for execution in association with loading the computer game application for execution, the mobile telephony module providing a mobile telephony user interface responsive to input received from the gamer during execution of the computer game application for selectively controlling at least one of mobile telephone calling operations and mobile telephone messaging operations provided by the mobile telephone in a manner that at least substantially avoids interrupting (a) gamer perception of ongoing game play, and (b) gamer interaction with the visual game environment; wherein a wireless communication interface is provided between the mobile telephone and the computer system, the computer system being separate from the mobile telephone; wherein the mobile telephone comprises a mobile telephone memory, the mobile telephone memory comprising a remote mobile application; wherein the remote mobile application is configured to send at least one of mobile telephony notifications or mobile telephony content to the computer system, by way of the wireless communication interface, wherein the mobile telephony module is configured to receive the at least one of mobile telephony notifications or mobile telephony content from the mobile telephone and further configured to update the mobile telephony user interface based on the received at least one of mobile telephony notifications or mobile telephony content.

In example 14, the subject matter of example 13 can optionally include that the mobile telephone comprises: a mobile telephone processing unit; and a memory including a mobile operating system and a remote mobile telephone control application executable by the mobile telephone processing unit, the remote mobile telephone control application configured for communication with each of the mobile operating system and the computer system's mobile telephony module.

In example 15, the subject matter of example 14 can optionally include that the mobile telephone includes a first communication interface and the computer system includes a second communication interface, and wherein at least one of mobile telephone call voice signals and mobile telephone message contents are exchanged between the remote mobile telephone control application and the mobile telephony module during computer game application execution by way of the first communication interface and the second communication interface.

In example 16, the subject matter of example 13 can optionally include that the mobile telephony module is responsive to at least one of visual gamer input and audio gamer input directed to performing a mobile telephone calling operation or a mobile telephone messaging operation during game play.

In example 17, the subject matter of example 16 can optionally include that the computer system further comprises at least one of a keyboard, a mouse, a joystick, and a game controller configured for receiving gamer input corresponding to each of game play and mobile telephony operations.

In example 18, the subject matter of example 13 can optionally include that the computer system further comprises a display device configured for presenting the visual game environment to the gamer, and wherein the mobile telephony interface selectively presents a set of visual mobile telephony control objects to the gamer within a portion of the visual game environment during game play.

In example 19, the subject matter of example 18 can optionally include that the set of visual mobile telephony control objects comprises: a first visual object corresponding to a notification of an incoming mobile telephone call; a second visual object corresponding to a gamer instruction to establish an outgoing mobile telephone call; and a third visual object corresponding to a gamer instruction to terminate an ongoing mobile telephone call.

In example 20, the subject matter of example 18 can optionally include that the set of visual mobile telephony control objects comprises: a first visual object corresponding to a notification of a new unread message; a second visual object corresponding to a gamer instruction to compose a message; and a third visual object corresponding to a gamer instruction to send a message to at least one destination mobile telephone number.

Example A1 is a method for providing mobile telephony operations, the method comprising: coupling a computer system to a mobile telephone separate from the computer system, using a wireless communication interface; providing a computer game application in the computer system, the computer game application configured to provide a visual game environment to a gamer; providing a mobile telephony module in the computer system; providing a mobile telephony user interface using the mobile telephony module, wherein the mobile telephony user interface is responsive to input received from the gamer during execution of the computer game application for selectively controlling at least one of mobile telephone calling operations and mobile telephone messaging operations provided by the mobile telephone, in a manner that at least substantially avoids interrupting (a) gamer perception of ongoing game play, and (b) gamer interaction with the visual game environment; receiving in the mobile telephony module, at least one of mobile telephony notifications or mobile telephony content from the mobile telephone, by way of the wireless communication interface; and updating the mobile telephony user interface based on the received at least one of mobile telephony notifications or mobile telephony content, using the mobile telephony module.

In example A2, the subject matter of example A1 can optionally include that the mobile telephony module corresponds to the computer game application, and wherein the mobile telephony module comprises program instructions loaded for execution in association with loading the computer game application for execution by the computer system.

In example A3, the subject matter of example A1 can optionally include providing a remote mobile application in the mobile telephone.

In example A4, the subject matter of example A3 can optionally include sending the at least one of mobile telephony notifications or mobile telephony content to the computer system using the remote mobile application.

In example A5, the subject matter of example A1 can optionally include that the computer game application is configured to provide a computer game user interface responsive to input received from the gamer during execution of the computer game application, the computer game user interface presenting a game environment including the visual game environment.

In example A6, the subject matter of example A1 can optionally include that the at least one of mobile telephone calling operations and mobile telephone messaging operations occur at least substantially simultaneous with respect to updates of the visual game environment and processing of events in the computer game application.

In example A7, the subject matter of example A1 can optionally include that the at least one of mobile telephone calling operations and mobile telephone messaging operations comprise: providing a notification of an incoming mobile telephone call to the gamer by way of the mobile telephony user interface; answering the incoming mobile telephone call in response to gamer input directed to the mobile telephony user interface; making an outgoing mobile telephone call in response to gamer input directed to the mobile telephony user interface; and communicating mobile telephone call voice signals between the mobile telephone and the mobile telephony module.

In example A8, the subject matter of example A7 can optionally include that providing a notification of an incoming mobile telephone call comprises at least one of presenting a visual notification to the gamer by way of a visual object within a portion of the visual game environment or presenting an audio notification to the gamer by way of a speaker during computer game application execution.

In example A9, the subject matter of example A7 can optionally include that at least one of answering the incoming mobile telephone call and making the outgoing mobile telephone call occurs in response to one of gamer selection of a visual object within a portion of the visual game environment and receipt of gamer speech directed to a microphone during computer game application execution.

In example A10, the subject matter of example A1 can optionally include that the at least one of mobile telephone calling operations and mobile telephone messaging operations comprise: providing a notification of a newly received unread message to the gamer by way of the mobile telephony user interface; composing a message in response to gamer input directed to the mobile telephony user interface; communicating a message content between the mobile telephone and the mobile telephony module; presenting the message content to the gamer by way of the mobile telephony user interface; and sending a message to at least one destination mobile telephone number in response to gamer input directed to the mobile telephony user interface.

In example A11, the subject matter of example A10 can optionally include that providing the notification of the newly received unread message comprises at least one of presenting a visual notification to the gamer by way of a visual object within a portion of the visual game environment and presenting an audio notification to the gamer by way of a speaker during computer game application execution.

In example A12, the subject matter of example A10 can optionally include that at least one of composing the message, presenting the message content, and sending the message occurs in response to one of gamer selection of a visual object within a portion of the visual game environment and receipt of gamer speech directed to a microphone during computer game application execution.

In example A13, the subject matter of example A1 can optionally include initiating execution of a remote mobile application on the mobile telephone; initiating execution of the computer game application and the mobile telephony module on the computer system, wherein the mobile telephony module is loaded for execution during loading of the computer game application for execution; and establishing communication between the remote mobile application and the mobile telephony module.

In example A14, the subject matter of example A13 can optionally include communicating at least one of mobile telephone call information and mobile telephone message information between the remote mobile application and the mobile telephony module during computer game execution; and presenting the mobile telephone call information to the gamer in a manner that avoids substantially affecting a frame update rate at which visual game environment updates occur.

In example A15, the subject matter of example A1 can optionally include that the mobile telephony user interface provides at least one of a visual mobile telephony user interface and an audio mobile telephony user interface to the gamer during execution of the computer game application.

In example A16, the subject matter of example A15 can optionally include that the visual mobile telephony user interface comprises a set of visual objects presented within a portion of the visual game environment.

Example A17 is a computer system comprising: a wireless communication interface configured to couple the computer system to a mobile telephone separate from the computer system; and a memory comprising: a computer game application configured to provide a visual game environment to a gamer; and a mobile telephony module configured to provide a mobile telephony user interface responsive to input received from the gamer during execution of the computer game application for selectively controlling at least one of mobile telephone calling operations and mobile telephone messaging operations provided by the mobile telephone, in a manner that at least substantially avoids interrupting (a) gamer perception of ongoing game play, and (b) gamer interaction with the visual game environment, wherein the mobile telephony module is further configured to receive at least one of mobile telephony notifications or mobile telephony content from the mobile telephone by way of the wireless communication interface; and wherein the mobile telephony module is further configured to update the mobile telephony user interface based on the received at least one of mobile telephony notifications or mobile telephony content.

In example A18, the subject matter of example A17 can optionally include a processing unit configured to execute the computer game application.

In example A19, the subject matter of example A17 can optionally include that the computer game application is configured to provide a computer game user interface presenting a game environment, wherein the game environment comprises the visual game environment.

In example A20, the subject matter of example A17 can optionally include that the mobile telephony module corresponds to the computer game application, the mobile telephony module comprising program instructions loaded for execution in association with loading the computer game application for execution.

In example A21, the subject matter of example A17 can optionally include that the mobile telephony module is responsive to at least one of visual gamer input and audio gamer input directed to performing the at least one of mobile telephone calling operations or the mobile telephone messaging operations during game play.

In example A22, the subject matter of example A17 can optionally include at least one of a keyboard, a mouse, a joystick, and a game controller configured to receive gamer input corresponding to each of game play and the at least one of mobile telephone calling operations and mobile telephone messaging operations.

In example A23, the subject matter of example A17 can optionally include a display device configured for presenting the visual game environment to the gamer, and wherein the mobile telephony user interface selectively presents a set of visual mobile telephony control objects to the gamer within a portion of the visual game environment during game play.

In example A24, the subject matter of example A23 can optionally include that the set of visual mobile telephony control objects comprises: a first visual object corresponding to a notification of an incoming mobile telephone call; a second visual object corresponding to a gamer instruction to establish an outgoing mobile telephone call; and a third visual object corresponding to a gamer instruction to terminate an ongoing mobile telephone call.

In example A25, the subject matter of example A23 can optionally include that the set of visual mobile telephony control objects comprises: a first visual object corresponding to a notification of a new unread message; a second visual object corresponding to a gamer instruction to compose a message; and a third visual object corresponding to a gamer instruction to send a message to at least one destination mobile telephone number.

Example A26 is a method for providing mobile telephony operations, the method comprising: coupling a mobile telephone to a computer system separate from the computer mobile telephone, using a wireless communication interface, providing at least one of mobile telephone calling operations and mobile telephone messaging operations using the mobile telephone; providing a remote mobile application in the mobile telephone; sending at least one of mobile telephony notifications or mobile telephony content from the remote mobile application to a mobile telephony module in the computer system, by way of the wireless communication interface, wherein the mobile telephony module is configured to provide a mobile telephony user interface responsive to input received from a gamer during execution of a computer game application in the computer system, for selectively controlling at least one of mobile telephone calling operations and mobile telephone messaging operations, in a manner that at least substantially avoids interrupting (a) gamer perception of ongoing game play, and (b) gamer interaction with a visual game environment provided by the computer game application; wherein the mobile telephony user interface is configured to update the mobile telephony user interface based on the at least one of mobile telephony notifications or mobile telephony content sent from the remote mobile application.

Example A27 is a mobile telephone comprising: a wireless communication interface configured to couple the mobile telephone to a computer system separate from the mobile telephone, the computer system comprising a computer game application configured to provide a visual game environment to a gamer; a mobile operating system configured to provide at least one of mobile telephone calling operations and mobile telephone messaging operations; and a remote mobile application configured to send at least one of mobile telephony notifications or mobile telephony content to the computer system by way of the wireless communication interface, for updating a mobile telephony user interface in the computer system, wherein the mobile telephony user interface is responsive to input received from the gamer during execution of the computer game application, for selectively controlling the at least one of mobile telephone calling operations and mobile telephone messaging operations, in a manner that at least substantially avoids interrupting (a) gamer perception of ongoing game play, and (b) gamer interaction with the visual game environment.

In example A28, the subject matter of example A27 can optionally include that the mobile telephone is configured to communicate with a mobile telephone network.

In example A29, the subject matter of example A27 can optionally include a mobile phone memory configured.

In example A30, the subject matter of example A27 can optionally include that the mobile phone memory stores the remote mobile application and the mobile operating system.

In example A31, the subject matter of example A30 can optionally include a mobile telephone processing unit, wherein the mobile telephone processing unit is configured to execute the remote mobile application.

In example A32, the subject matter of example A27 can optionally include that the remote mobile application is configured to communicate with each of the mobile operating system and the mobile telephony module.

In example A33, the subject matter of example A27 can optionally include that the mobile telephone includes a first communication interface and the computer system includes a second communication interface, and wherein at least one of mobile telephone call voice signals and mobile telephone message contents are exchanged between the remote mobile application and the mobile telephony module during computer game application execution by way of the first communication interface and the second communication interface.

The phrase "mobile telephony user interface" may be used interchangeably with the phrase "mobile telephony interface".

What is claimed is:

1. A method for providing mobile telephony operations, the method comprising:
    coupling a mobile telephone to a computer system separate from the mobile telephone, using a wireless communication interface,
    providing at least one of mobile telephone calling operations and mobile telephone messaging operations using the mobile telephone;
    providing a remote mobile application in the mobile telephone;
    sending at least one of mobile telephony notifications or mobile telephony content from the remote mobile application to a mobile telephony module in the computer system, by way of the wireless communication interface, wherein the mobile telephony module is configured to provide a mobile telephony user interface responsive to input received from a gamer during execution of a computer game application in the computer system, for selectively controlling the at least one of mobile telephone calling operations and mobile telephone messaging operations, in a manner that at least substantially avoids interrupting (a) gamer perception of ongoing game play, and (b) gamer interaction with a visual game environment provided by the computer game application;
    wherein the mobile telephony module is configured to update the mobile telephony user interface based on the at least one of mobile telephony notifications or mobile telephony content sent from the remote mobile application.

2. The method of claim 1, wherein the mobile telephony module corresponds to the computer game application, and wherein the mobile telephony module comprises program instructions loaded for execution in association with loading the computer game application for execution by the computer system.

3. The method of claim 1, wherein the computer game application is configured to provide a computer game user interface responsive to input received from the gamer during execution of the computer game application, the computer game user interface presenting a game environment including the visual game environment.

4. The method of claim 1, wherein the at least one of mobile telephone calling operations and mobile telephone messaging operations occur at least substantially simultaneous with respect to updates of the visual game environment and processing of events in the computer game application.

5. The method of claim 1, wherein the at least one of mobile telephone calling operations and mobile telephone messaging operations comprise:
    providing a notification of an incoming mobile telephone call to the gamer by way of the mobile telephony user interface;
    answering the incoming mobile telephone call in response to gamer input directed to the mobile telephony user interface;
    making an outgoing mobile telephone call in response to gamer input directed to the mobile telephony user interface; and
    communicating mobile telephone call voice signals between the mobile telephone and the mobile telephony module.

6. The method of claim 5, wherein providing the notification of the incoming mobile telephone call comprises at least one of presenting a visual notification to the gamer by way of a visual object within a portion of the visual game environment or presenting an audio notification to the gamer by way of a speaker during computer game application execution.

7. The method of claim 5, wherein at least one of answering the incoming mobile telephone call and making the outgoing mobile telephone call occurs in response to one of gamer selection of a visual object within a portion of the visual game environment and receipt of gamer speech directed to a microphone during computer game application execution.

8. The method of claim 1, wherein the at least one of mobile telephone calling operations and mobile telephone messaging operations comprise:
    providing a notification of a newly received unread message to the gamer by way of the mobile telephony user interface;
    composing a message in response to gamer input directed to the mobile telephony user interface;
    communicating a message content between the mobile telephone and the mobile telephony module;
    presenting the message content to the gamer by way of the mobile telephony user interface; and
    sending a message to at least one destination mobile telephone number in response to the gamer input directed to the mobile telephony user interface.

9. The method of claim 8, wherein providing the notification of the newly received unread message comprises at least one of presenting a visual notification to the gamer by way of a visual object within a portion of the visual game environment and presenting an audio notification to the gamer by way of a speaker during computer game application execution.

10. The method of claim 8, wherein at least one of composing the message, presenting the message content, and sending the message occurs in response to one of gamer selection of a visual object within a portion of the visual game environment and receipt of gamer speech directed to a microphone during computer game application execution.

11. The method of claim 1, further comprising:
    initiating execution of the remote mobile application on the mobile telephone;
    initiating execution of the computer game application and the mobile telephony module on the computer system, wherein the mobile telephony module is loaded for execution during loading of the computer game application for execution; and
    establishing communication between the remote mobile application and the mobile telephony module.

12. The method of claim 11, further comprising:
    communicating the at least one of mobile telephone call information and mobile telephone message information between the remote mobile application and the mobile telephony module during computer game execution; and
    presenting the mobile telephone call information to the gamer in a manner that avoids substantially affecting a frame update rate at which visual game environment updates occur.

13. The method of claim 1, wherein the mobile telephony user interface provides a visual mobile telephony user interface comprising a set of visual objects presented within a portion of the visual game environment.

14. A system comprising:
   a wireless communication interface configured to couple a mobile telephone to a computer system separate from the mobile telephone, the computer system comprising a computer game application configured to provide a visual game environment to a gamer;
   a mobile operating system configured to provide at least one of mobile telephone calling operations and mobile telephone messaging operations; and
   a remote mobile application configured to send at least one of mobile telephony notifications or mobile telephony content to the computer system by way of the wireless communication interface, for updating a mobile telephony user interface in the computer system,
   wherein the mobile telephony user interface is responsive to input received from the gamer during execution of the computer game application, for selectively controlling the at least one of mobile telephone calling operations and mobile telephone messaging operations, in a manner that at least substantially avoids interrupting (a) gamer perception of ongoing game play, and (b) gamer interaction with the visual game environment.

15. The system of claim 14, wherein the remote mobile application is configured to communicate with each of the mobile operating system and the mobile telephony user interface.

16. The system of claim 14, wherein the mobile telephone includes a first communication interface and the computer system includes a second communication interface, and wherein at least one of mobile telephone call voice signals and mobile telephone message contents are exchanged between the remote mobile application and the mobile telephony user interface during computer game application execution by way of the first communication interface and the second communication interface.

17. The system of claim 14, wherein the mobile telephony user interface selectively presents a set of visual mobile telephony control objects to the gamer within a portion of the visual game environment during game play, wherein the set of visual mobile telephony control objects comprises:
   a first visual object corresponding to a notification of an incoming mobile telephone call;
   a second visual object corresponding to a gamer instruction to establish an outgoing mobile telephone call; and
   a third visual object corresponding to a gamer instruction to terminate an ongoing mobile telephone call.

18. The system of claim 14, wherein the mobile telephony user interface selectively presents a set of visual mobile telephony control objects to the gamer within a portion of the visual game environment during game play, wherein the set of visual mobile telephony control objects comprises:
   a first visual object corresponding to a notification of a new unread message;
   a second visual object corresponding to a gamer instruction to compose a message; and
   a third visual object corresponding to a gamer instruction to send a message to at least one destination mobile telephone number.

* * * * *